United States Patent
Lee et al.

(10) Patent No.: US 11,717,123 B2
(45) Date of Patent: Aug. 8, 2023

(54) VACUUM CLEANER

(71) Applicant: LG Electronics Inc., Seoul (KR)

(72) Inventors: Youngjoo Lee, Seoul (KR); Jungmin Ko, Seoul (KR); Soohan Eo, Seoul (KR); Kietak Hyun, Seoul (KR); Inkyu Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

(21) Appl. No.: 17/271,155

(22) PCT Filed: Sep. 16, 2019

(86) PCT No.: PCT/KR2019/011942
§ 371 (c)(1),
(2) Date: Feb. 24, 2021

(87) PCT Pub. No.: WO2020/055214
PCT Pub. Date: Mar. 19, 2020

(65) Prior Publication Data
US 2021/0186287 A1    Jun. 24, 2021

(30) Foreign Application Priority Data

Sep. 14, 2018 (KR) .......... 10-2018-0110019
Sep. 14, 2018 (KR) .......... 10-2018-0110021
(Continued)

(51) Int. Cl.
*A47L 9/10* (2006.01)
*A47L 9/12* (2006.01)
(Continued)

(52) U.S. Cl.
CPC .......... *A47L 9/108* (2013.01); *A47L 5/28* (2013.01); *A47L 9/12* (2013.01); *A47L 9/127* (2013.01);
(Continued)

(58) Field of Classification Search
CPC .......... A47L 9/1691; A47L 9/169; A47L 9/12; A47L 9/1683; A47L 9/165; A47L 5/24; A47L 9/20; Y10S 55/03; B01D 2279/55
See application file for complete search history.

(56) References Cited

U.S. PATENT DOCUMENTS 2,581,949 A * 1/1952 Gerber ............ A47L 9/20
96/419
2,645,303 A * 7/1953 Meyerhoefer ........ A47L 9/20
55/305
(Continued)

FOREIGN PATENT DOCUMENTS

CN    1511496 A    7/2004
CN    1545972 A    11/2004
(Continued)

OTHER PUBLICATIONS

Examination report for Australian Application No. 2019339912, dated Nov. 16, 2021.
(Continued)

*Primary Examiner* — Anne M Kozak
*Assistant Examiner* — Christopher Soto
(74) *Attorney, Agent, or Firm* — Birch, Stewart, Kolasch & Birch, LLP

(57) ABSTRACT

A vacuum cleaner includes a suctioning unit, a main body including a cyclone unit for separating dust from the air suctioned through the suctioning unit, a body forming a dust container for storing the dust separated by the cyclone unit, and a body cover for opening and closing the lower side of
(Continued)

the body. A filter unit is arranged in the body for filtering air. An actuating unit is configured to move in the body along a space between the outside of the filter unit and the inner circumferential surface of the body.

21 Claims, 31 Drawing Sheets

(30) Foreign Application Priority Data

| Sep. 14, 2018 | (KR) | 10-2018-0110026 |
|---|---|---|
| Feb. 22, 2019 | (KR) | 10-2019-0021320 |
| Jun. 27, 2019 | (KR) | 10-2019-0077237 |

(51) Int. Cl.

| A47L 9/16 | (2006.01) |
|---|---|
| A47L 5/28 | (2006.01) |
| A47L 9/20 | (2006.01) |
| B01D 45/16 | (2006.01) |
| B01D 46/00 | (2022.01) |
| B01D 46/24 | (2006.01) |
| B04C 5/185 | (2006.01) |
| B04C 5/26 | (2006.01) |
| B04C 9/00 | (2006.01) |
| B01D 50/20 | (2022.01) |
| A47L 9/22 | (2006.01) |
| A47L 9/28 | (2006.01) |
| A47L 9/32 | (2006.01) |
| A47L 5/24 | (2006.01) |

(52) U.S. Cl.
CPC .............. *A47L 9/165* (2013.01); *A47L 9/1616* (2013.01); *A47L 9/1658* (2013.01); *A47L 9/1683* (2013.01); *A47L 9/1691* (2013.01); *A47L 9/20* (2013.01); *A47L 9/22* (2013.01); *A47L 9/2884* (2013.01); *A47L 9/322* (2013.01); *B01D 45/16* (2013.01); *B01D 46/0041* (2013.01); *B01D 46/2403* (2013.01); *B01D 50/20* (2022.01); *B04C 5/185* (2013.01); *B04C 5/26* (2013.01); *B04C 9/00* (2013.01); *A47L 5/24* (2013.01); *B01D 2279/55* (2013.01); *B04C 2009/004* (2013.01)

(56) References Cited

U.S. PATENT DOCUMENTS

| 2,714,426 | A | * | 8/1955 | White | A47L 5/365 |
| | | | | | 55/366 |
| 3,797,064 | A | * | 3/1974 | MacFarland | A47L 9/20 |
| | | | | | 55/296 |
| 5,704,956 | A | * | 1/1998 | Loveless | B01D 46/76 |
| | | | | | 55/482 |
| 6,625,845 | B2 | * | 9/2003 | Matsumoto | A47L 9/20 |
| | | | | | 15/352 |
| 7,074,248 | B2 | | 7/2006 | Jin et al. | |
| 7,370,387 | B2 | | 5/2008 | Walker et al. | |
| 7,594,297 | B2 | | 9/2009 | Choi | |
| 8,156,609 | B2 | | 4/2012 | Milne et al. | |
| 8,308,831 | B2 | * | 11/2012 | Coburn | A47L 9/125 |
| | | | | | 15/352 |
| 8,925,145 | B2 | | 1/2015 | Wilson | |
| 9,687,128 | B2 | | 6/2017 | Fan et al. | |
| 10,143,345 | B2 | | 12/2018 | Peters | |
| 10,231,587 | B2 | | 3/2019 | Krebs | |
| 10,299,648 | B2 | | 5/2019 | Peters et al. | |
| 10,390,670 | B2 | | 8/2019 | Robinson et al. | |
| 10,898,044 | B2 | | 1/2021 | Grey et al. | |
| 2001/0025395 | A1 | | 10/2001 | Matsumoto et al. | |
| 2008/0264011 | A1 | | 10/2008 | Oh et al. | |
| 2010/0247771 | A1 | | 9/2010 | Home et al. | |
| 2014/0215751 | A1 | | 8/2014 | Kasper | |
| 2016/0183750 | A1 | | 6/2016 | Fan et al. | |
| 2017/0290950 | A1 | | 10/2017 | Nam et al. | |
| 2018/0055318 | A1 | | 3/2018 | Gottschall et al. | |
| 2018/0125316 | A1 | | 5/2018 | Woo et al. | |
| 2018/0132685 | A1 | | 5/2018 | Muir et al. | |
| 2018/0132686 | A1 | | 5/2018 | Muir et al. | |
| 2019/0183301 | A1 | | 6/2019 | Hwang et al. | |
| 2020/0069130 | A1 | * | 3/2020 | Mantes | A47L 9/20 |
| 2021/0113045 | A1 | | 4/2021 | Hwang et al. | |

FOREIGN PATENT DOCUMENTS

| CN | 1911151 A | 2/2014 |
|---|---|---|
| CN | 106993977 A | 8/2017 |
| CN | 106993978 A | 8/2017 |
| CN | 106993979 A | 8/2017 |
| CN | 207384196 U | 5/2018 |
| EP | 1 136 028 A2 | 9/2001 |
| EP | 1 987 754 A2 | 11/2008 |
| EP | 3 175 759 A1 | 6/2017 |
| JP | 54-51258 A | 4/1979 |
| JP | 55-78054 U | 5/1980 |
| JP | 56-52027 A | 5/1981 |
| JP | 57-81746 U | 5/1982 |
| JP | 2001-269297 A | 10/2001 |
| JP | 2002-51949 A | 2/2002 |
| JP | 2002-223993 A | 8/2002 |
| JP | 2002-282178 A | 10/2002 |
| JP | 2003-190056 | 7/2003 |
| JP | 3699679 B2 | 7/2003 |
| JP | 2003-310507 A | 11/2003 |
| JP | 2004249010 A | 9/2004 |
| JP | 2004-298860 A | 10/2004 |
| JP | 2005-304734 A | 11/2005 |
| JP | 2006-205168 A | 8/2006 |
| JP | 2006-320453 A | 11/2006 |
| JP | 2006320455 A | 11/2006 |
| JP | 2006-340972 A | 12/2006 |
| JP | 2007029187 A | 2/2007 |
| JP | 2008-080146 | 4/2008 |
| JP | 2009-504305 A | 2/2009 |
| JP | 2011-188910 A | 9/2011 |
| JP | 2013-22048 A | 2/2013 |
| JP | 2013022224 A | 2/2013 |
| JP | 2017-159022 A | 9/2017 |
| JP | 6366750 B2 | 7/2018 |
| JP | 2019-523118 A | 8/2019 |
| KR | 10-2001-0090527 A | 10/2001 |
| KR | 10-2004-0085308 A | 10/2004 |
| KR | 10-0606794 B1 | 8/2006 |
| KR | 10-2006-0098765 A | 9/2006 |
| KR | 10-0634805 B1 | 9/2006 |
| KR | 10-0880492 B1 | 11/2006 |
| KR | 10-2011-0071920 A | 6/2011 |
| KR | 10-1649250 B1 | 8/2016 |
| KR | 10-2018-0023271 A | 3/2018 |
| KR | 10-2018-0023790 | 3/2018 |
| KR | 10-2018-0053614 A | 5/2018 |
| KR | 10-2018-0100201 | 9/2018 |
| TW | 201735847 A | 10/2017 |
| WO | WO 2018/038473 A1 | 3/2018 |
| WO | WO 2019/164258 A1 | 8/2019 |

OTHER PUBLICATIONS

Australian Notice of Allowance for Australian Application No. 2019338911, dated Sep. 13, 2022.
Australian Notice of Allowance for Australian Application No. 2019338912, dated Sep. 14, 2022.
Australian Notice of Allowance for Australian Application No. 2019339245, dated Jul. 28, 2022.
Japanese Notice of Allowance for Japanese Application No. 2021-513938, dated Sep. 13, 2022.
Japanese Notice of Allowance for Japanese Application No. 2021-514075, dated Sep. 13, 2022.

(56) References Cited

OTHER PUBLICATIONS

Extended European Search Report for European Application No. 19859471.5, dated Jun. 28, 2022.

* cited by examiner (a)          (b)

VACUUM CLEANER

CROSS-REFERENCE TO RELATED APPLICATIONS

This is a National Stage Application under 35 U.S.C. § 371 of International Patent Application No. PCT/KR2019/011942, filed Sep. 16, 2019, which claims the benefit of priority of Korean Patent Applications Nos. 10-2018-0110019, filed Sep. 14, 2018; 10-2018-0110021, filed Sep. 14, 2018; 10-2018-0110026, filed Sep. 14, 2018; 10-2019-0021320, filed Feb. 22, 2019; and 10-2019-0077237, filed Jun. 27, 2019; all of which are incorporated herein in their entireties by reference.

TECHNICAL FIELD

The present disclosure relates to a cleaner.

BACKGROUND ART

Cleaners are devices which absorb or clean dust or particles in a cleaning target zone to perform cleaning.

The cleaners may be categorized into manual vacuum cleaners which perform cleaning while being moved on the basis of direct manipulation by a user and automatic vacuum cleaners which perform cleaning while moving autonomously.

Also, the manual vacuum cleaners may be categorized into canister-type cleaners, upright-type cleaners, handy-type cleaners, and stick-type cleaners on the basis of types of cleaners.

Prior art reference 1: Korean Patent Publication No. 10-2011-0106917

The prior art reference 1 discloses a handheld vacuum cleaner.

The handheld vacuum cleaner includes a separation device which separates waste and dust from an air current.

The separation device includes a centrifuge including one or more cyclones.

The centrifuge includes a first cyclone including a dust collector including a wall. The dust collector may be disposed at a lower portion of the first cyclone and may be opened or closed by a base. The base rotates based on a hinge to open or close the dust collector.

A plurality of holes are provided in the first cyclone, and a portion of the first cyclone includes a trapezoid cover. A second cyclone communicates with the first cyclone in the cover.

In the prior art reference 1, internal air of the first cyclone passes through the plurality of holes and moves to the second cyclone, and in a process where air passes through the plurality of holes, dust plugs the plurality of holes of the cover. As the plurality of holes are much plugged, air flow is not smooth, causing a reduction in separation performance.

Therefore, a user should periodically clean the cover. In the prior art reference 1, a user should rotate the base to open the dust collector, approach the cover, and clean the cover, and due to this, it is not easy to clean the cover.

Moreover, in the prior art reference 1, dust separated from the first cyclone and the second cyclone is dropped downward and is collected on the base.

While a dust separation process is performed by a cleaner, when an operation of the cleaner stops, separated dust is stored in the dust collector at a low density.

Particularly, dust separated by the first cyclone occupies a very large volume compared to weight thereof, and due to this, dust in the dust collector should be frequently removed for maintaining dust collection performance.

Prior art reference 2: Japanese Patent Registration No. 3699679

The prior art reference 2 discloses technology for compressing internal dust of a dust collection case.

The dust collection case includes a dust separation chamber which separates dust from air with a centrifugal force, a dust accommodating chamber which accommodates inflow dust, an intake cylinder which is disposed at a center portion of the dust separation chamber, and a filter which is disposed outside the intake cylinder.

Air of the dust separation chamber passes through the filter, and then, moves into the intake cylinder.

An outer canister is provided outside the intake cylinder, a compression plate is provided under the outer canister, and a brush is provided on an inner circumference surface of the outer canister. A plurality of opening portions are provided in the outer canister so as not to hinder flow of air from the dust separation chamber to the intake cylinder.

In order to manipulate the outer canister, a manipulation lever is provided outside the outer canister in a diameter direction of the outer canister. The manipulation lever is disposed outside the dust separation chamber.

Therefore, when a user manipulates the manipulation lever to lower the outer canister and the compression plate, the brush on an inner surface of the outer canister cleans the filter outside the intake cylinder, and the compression plate compresses dust stored in the dust accommodating chamber.

However, in the prior art reference 2, the outer canister is configured to surround the whole of the intake cylinder in a state where the manipulation lever is not manipulated, and thus, the plurality of opening portions are provided in the outer canister in order for air to pass through the outer canister.

However, although the plurality of opening portions are provided in the outer canister, a portion where an opening portion is not provided act as an air flow resistor, causing a reduction in air flow performance.

Moreover, since the outer canister is disposed outside the intake cylinder, dust of the dust separation chamber contacts the outer canister in a state where the manipulation lever is not manipulated, and due to this, the outer canister is polluted, whereby it is required to additionally clean the outer canister.

Moreover, in the prior art reference 2, since the manipulation lever is disposed outside the dust separation chamber, a slot should be vertically provided in the dust separation chamber in order for the manipulation lever to vertically move.

The manipulation lever does not cover the whole of the slot, and due to this, the internal air and dust of the dust separation chamber is leaked to the outside through the slot.

Moreover, in the prior art reference 2, there is no structure which enables the outer canister to move without being eccentric in the middle of moving upward and downward, and due to this, a vertical motion of the outer canister is not smooth.

Moreover, in the prior art reference 2, the dust collection case may be detached from a cleaner body, and then, the manipulation lever may be manipulated, causing the inconvenience of a user.

DISCLOSURE

Technical Problem

The present embodiment provides a cleaner which compresses dust of a dust container on the basis of manipulation of a compression mechanism and easily discharges the dust from the dust container.

The present embodiment provides a cleaner in which a movable part in a dust container is easily manipulated outside the dust container.

The present embodiment provides a cleaner in which a movable part moves smoothly in a vertical direction without interference caused by a peripheral structure.

The present embodiment provides a cleaner in which an eddy current is reduced in a guide body with a transfer part disposed therein so as to transfer a dynamic force to a movable part, and thus, dust flowing into the guide body easily moves into a dust container.

Technical Solution

A cleaner includes a suction part, a main body including a body, including a cyclone part configured to separate dust from air suctioned through the suction part and a dust container configured to store the dust separated by the cyclone part, and a body cover configured to open or close a lower portion of the body, a filter part disposed in the body and configured to filter air in a process where dust separated from air passes through the filter part, a movable part configured to move along a space between an outer portion of the filter part and an inner circumference surface of the body in the body, a manipulation part disposed outside the main body and manipulated for moving the movable part, and a transfer part disposed radially outside of an inner circumference surface of the body where cyclone flow is formed, the transfer part passing through the main body and connecting the movable part to the manipulation part.

The body may define a dust container for storing dust, and the transfer part may be disposed outside an inner circumference surface of the dust container in a radius direction thereof.

In the present embodiment, the body may be provided in a cylindrical shape, a guide body may protrude outward from the body, and a movement space through which the transfer part moves may be provided in the guide body.

An internal space of the body may communicate with the movement space through a communication hole.

The guide body may extend from the body in a normal-line direction, and thus, an eddy current may decrease in the guide body where the transfer part is disposed, whereby dust flowing into the guide body may easily move into the dust container.

The guide body may include a first part and a second part disposed downstream of the first part, with respect to air flow in the body. A round part may be provided at a boundary portion between the second part and the body.

A protrusion part protruding to a center may be provided near the first part in the body. Air flowing along an inner circumference surface of the body may be limited in flowing to the guide body.

The movable part may include a frame having a ring shape and a connection part disposed in the movement space to extend outward from the frame in a radius direction thereof and to pass through the communication hole, and thus, the movable part and the transfer part may move upward and downward without interference caused by a peripheral structure.

An opening through which the transfer part passes may be provided in an upper sidewall of the guide body.

The connection part may include an extension part extending from the frame and a coupling part having a diameter which is greater than a horizontal-direction width of the extension part, and the transfer part may be coupled to the coupling part at a portion on the coupling part.

An extension line of the extension part may pass through a center of the frame, thereby preventing a phenomenon where the frame rotates due to a moment in a process where a manipulation force of the manipulation part is transferred to the frame by the transfer part.

The communication hole may include a lower hole having a width which is greater than a diameter of the coupling part and an upper hole extending to an upper portion of the lower hole and having a width which is less than a width of the lower hole, whereby the coupling part may be easily inserted into the movable space of the guide body through a lower hole.

The width of the upper hole may be set to be greater than the horizontal-direction width of the extension part and less than the diameter of the coupling part, thereby minimizing a degree to which air and dust flow into the guide body through the upper hole.

The frame may include a pressurization rib extending downward from an outer lower end of the frame, and the connection part may extend outward in a radius direction with respect to a lower portion of the pressurization rib, thereby increasing a distance between the connection part and the manipulation part.

The frame further includes one or more auxiliary ribs protruding in an inward direction from an inner circumference surface of the pressurization rib, thereby enhancing dust compression performance.

The suction part may include an inflow guide configured to guide flow of air so that cyclone flow is performed in the cyclone part, and the frame may include a frame guide extending in parallel with the inflow guide, for guiding air flowing along the inflow guide.

The frame guide may protrude downward from the frame.

The frame guide may be disposed at a position opposite to the pressurization rib with respect to a center of the frame.

A lower sidewall of the guide body may be disposed at a certain height from a lower end of the body and includes a lower opening, and the lower opening may be covered by a sealing member.

A portion of the sealing member may be inserted into the guide body through the lower opening, and an upper surface of the sealing member may be downward inclined in a direction closer to a center of the body.

The cleaner may further include a supporting part configured to support a lower portion of the filter part, wherein the movable part may further include a cleaning part configured to clean the filter part in a lowering process. An upper end of the supporting part may be equal to or less than a diameter of the filter part, and an outer circumference surface of the supporting part may be provided to have a diameter which is progressively reduced in a direction closer to a lower portion thereof.

Advantageous Effects

According to the embodiments, since the movable part of the compression mechanism is disposed in the body and the manipulation part is disposed outside the body, the user may manipulate the manipulation part, and thus, dust in the body may be compressed.

Moreover, when the compression mechanism is manipulated in a state where the body cover opens the body, dust may be downward moved by the movable part, and thus, dust in the body may be easily discharged from the body.

Moreover, since the movable part is disposed in the body and the transfer part is disposed outside an inner circumference surface in a radius direction of the inner circumference surface where cyclone flow is generated in the body, the transfer part and the movable part may move upward and downward without interference caused by a structure in the body.

Moreover, since the coupling part connected to the transfer part is disposed in the guide body, dust flowing into the guide body may be moved to a lower portion by the coupling part in a process of lowering the movable part and may move from the inside of the guide body to the dust container.

Moreover, since the guide body protrudes from the body in a normal-line direction, the amount of air flowing into the guide body may be reduced, and moreover, an eddy current in the guide body may be minimized, whereby air flowing into the guide body may be easily discharged from the guide body.

Moreover, since the upper surface of the sealing member coupled to the lower portion of the guide body is downward inclined in a direction closer to the center of the body, dust dropped from the guide body to the upper surface of the sealing member may easily move into the dust container.

Moreover, since the frame guide for guiding air is included in the frame for cyclone flow, the cyclone flow may be smoothly performed in the body.

DETAILED DESCRIPTION OF THE DISCLOSURE

Figure 1:
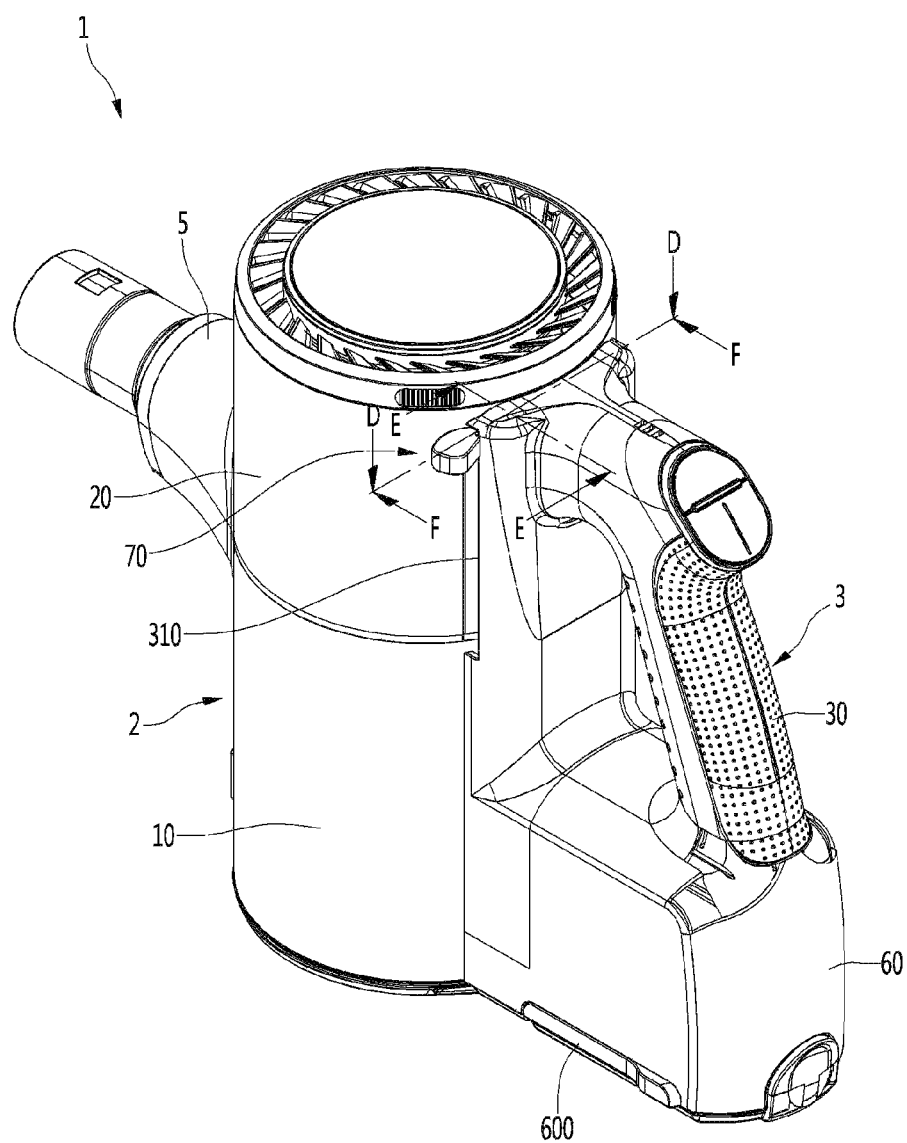
FIG. 1 is a perspective view of a cleaner according to an embodiment.

Hereinafter, exemplary embodiments of the present disclosure will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present disclosure.

In describing the elements of the present disclosure, terms such as first, second, A, B, (a), (b), etc., may be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it may be directly on or directly connected to the other element or layer, or intervening elements or layers may be present.

Herein, a radius direction may denote a direction intersecting an extension direction of an axis of cyclone flow (for example, a first cyclone part).

Figure 2:
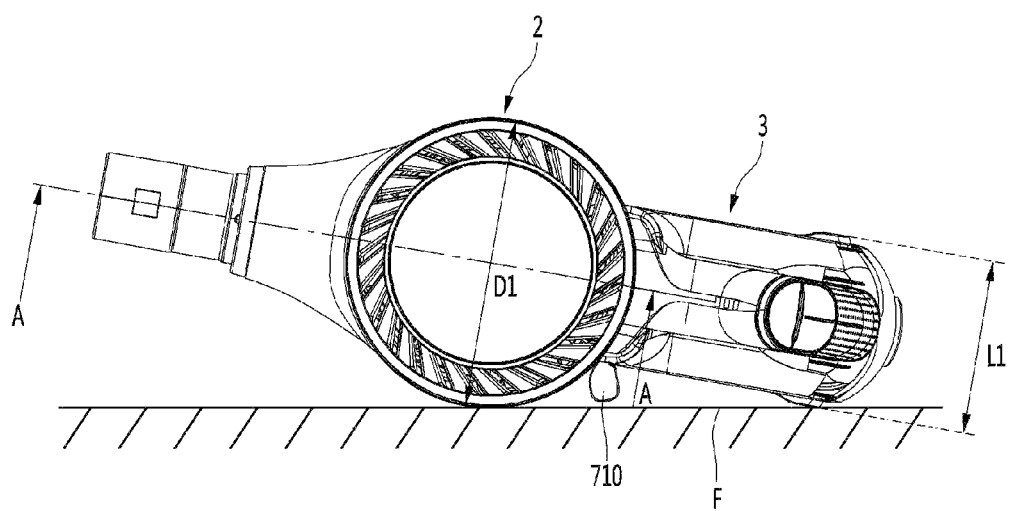
FIG. 2 is a diagram illustrating a state where a cleaner according to an embodiment is located on a floor surface with being laid.
Figure 3:
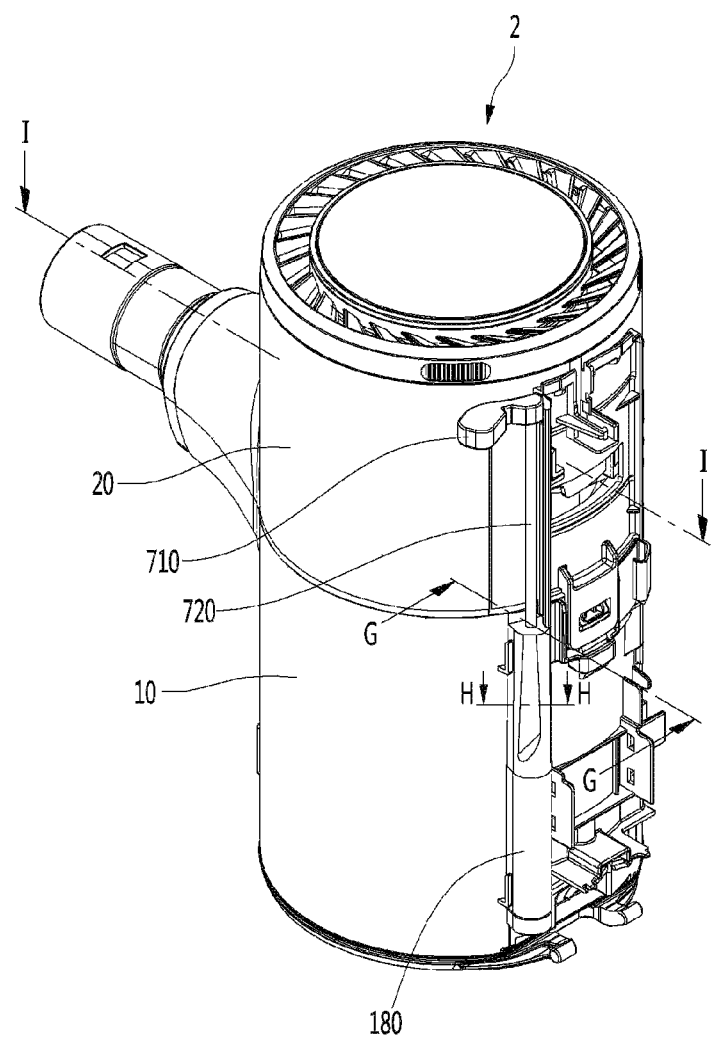
FIG. 3 is a perspective view illustrating a state where a handle part is detached from a cleaner according to an embodiment.
Figure 4:
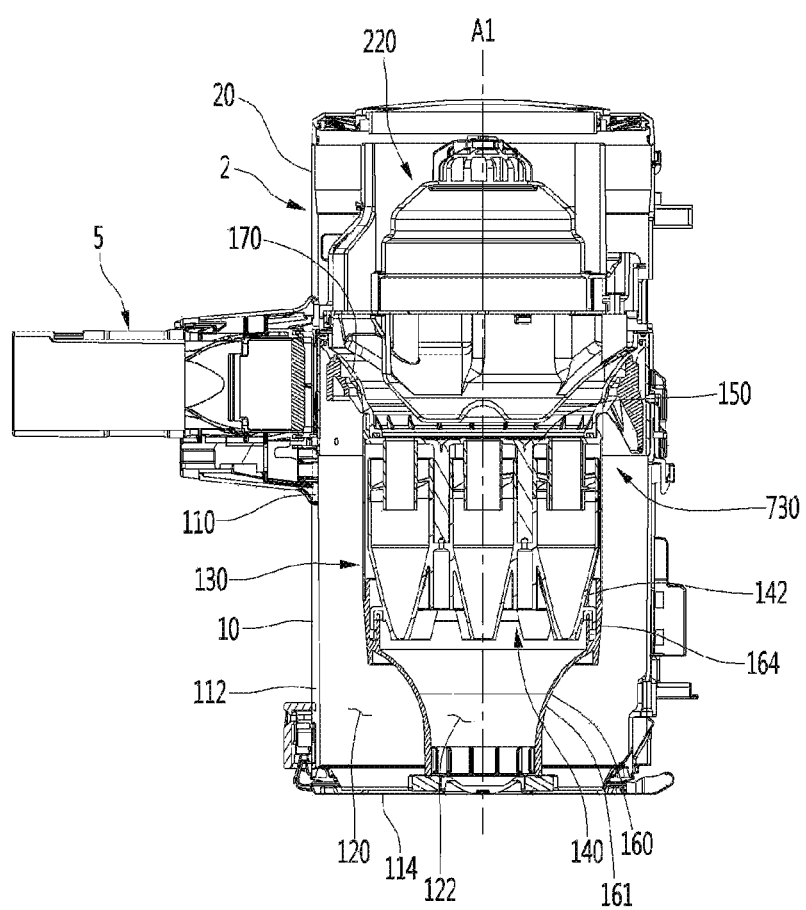
FIG. 4 is a cross-sectional view taken along line A-A of FIG. 2.

FIG. 1 is a perspective view of a cleaner according to an embodiment, FIG. 2 is a diagram illustrating a state where a cleaner according to an embodiment is located on a floor surface with being laid, FIG. 3 is a perspective view illustrating a state where a handle part is detached from a cleaner according to an embodiment, and FIG. 4 is a cross-sectional view taken along line A-A of FIG. 2.

Figure 5:
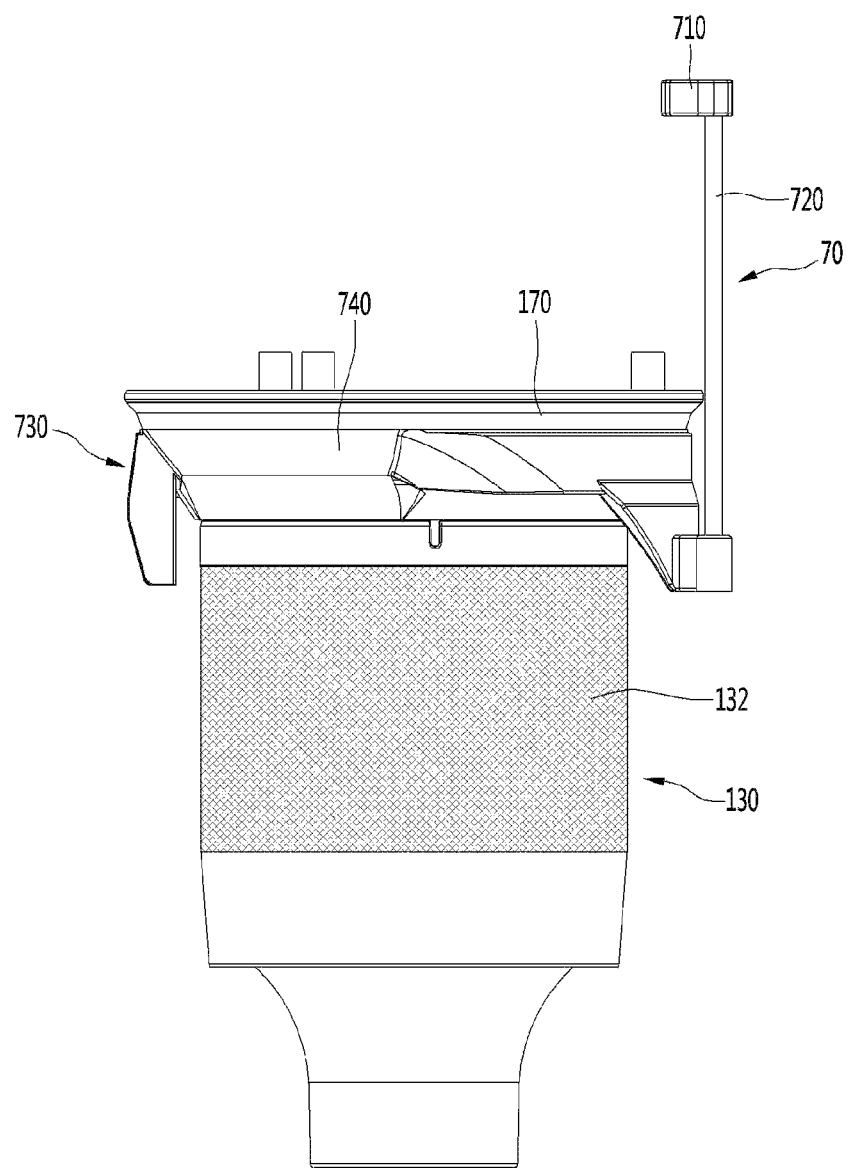
FIG. 5 is a diagram illustrating the arrangement of a movable part, a filter part, and an air guide of a compression mechanism.

FIG. 5 is a diagram illustrating the arrangement of a movable part, a filter part, and an air guide of a compression mechanism.

Referring to FIGS. 1 to 5, a cleaner 1 according to an embodiment may include a main body 2. The main body 2 may include a suction part 5 which sucks dust-containing air. The suction part 5 may guide dust containing air to the main body 2.

The cleaner 1 may further include a handle part 3 coupled to the main body 2. The handle part 3 may be disposed at a position opposite to the suction part 5 in the main body 2 for example. However, positions of the suction part 5 and the handle part 3 are not limited thereto.

The main body 2 may separate dust suctioned through the suction part 5 and may store the separated dust.

For example, the main body 2 may include a dust separation part. The dust separation part may include a first cyclone part 110 for separating dust through cyclone flow. The first cyclone part 110 may communicate with the suction part 5.

Air and dust suctioned through the suction part 5 may spirally move along an inner circumference surface of the first cyclone part 110.

The dust separation part may further include a second cyclone part 140 which secondarily separates dust from air discharged from the first cyclone part 110.

The second cyclone part 140 may include a plurality of cyclone bodies 142 disposed in parallel. Air may divisionally pass through the plurality of cyclone bodies 142.

As another example, the dust separation part may include a single cyclone part.

The main body 2 may be provided in a cylindrical shape for example, and an external appearance thereof may be formed by a plurality of bodies.

For example, the main body 2 may include a first body 10 which is substantially cylindrical in shape and a second main body 20 which is coupled to an upper portion of the first body 10 and is substantially cylindrical in shape.

An upper portion of the first body 10 may define the first cyclone part 110, and a lower portion of the first body 10 may define a dust container 112 which stores dust separated from the first cyclone part 110.

The lower portion of the first body 10 (i.e., a lower portion of the dust container 112) may be opened or closed by a body cover 114 which rotates based on a hinge.

The main body 2 may further include a filter part 130 which is disposed to surround the second cyclone part 140.

The filter part 130 may be provided in a cylindrical shape for example and may guide air, separated from dust in the first cyclone part 110, to the second cyclone part 140. The filter part 130 may filter out dust in a process where air passes through the filter part 130.

To this end, the filter part 130 may include a mesh portion including a plurality of holes. The mesh portion 132 is not limited, but may be formed of a metal material.

The mesh portion 132 may filter air, and due to this, dust may be collected in the mesh portion 132, whereby it is required to clean the mesh portion 132.

In an embodiment, the cleaner 1 may further include a compression mechanism 70 for compressing dust stored in the dust container (i.e., a first dust storage part 120).

Since capacity of the dust container 112 is limited, the amount of dust stored in the dust container 112 may increase during repeated cleaning, and thus a usage time of and the number of times the cleaner is used may be limited.

If the amount of dust stored in the dust container 112 increases, the user may cause the body cover 114 to open the dust container 112 to remove dust of the dust container 112.

In this embodiment, when dust stored in the dust container 112 is compressed using the compression mechanism 70, density of the dust stored in the dust container 112 increases, and thus a volume thereof decreases.

Therefore, according to the present embodiment, the number of times for emptying the dust container 112 is reduced, and accordingly, an available time before emptying the dust container advantageously increases.

The compression mechanism 70 may also clean the mesh portion 132 during a movement process.

The compression mechanism 70 may include a movable part 730 which is movable in the main body 2, a manipulation part 710 which is manipulated by a user so as to move the movable part 730, and a transfer part 720 which transfers a manipulation force of the manipulation part 710 to the movable part 730.

The manipulation part 710 may be disposed outside the main body 2. For example, the manipulation part 710 may be disposed outside the first body 10 and the second main body 20. The manipulation part 710 may be disposed to be higher than the first body 10. Also, the manipulation part 710 may be disposed to be higher than the movable part 730.

The handle part 3 may include a handle body 30 which is gripped by a user and a battery housing 60 which is disposed under the handle body 30 to accommodate a battery 600.

The handle body 30 may cover a portion of the manipulation part 710 and may guide movement of the manipulation part 710.

In a state where the user grips the handle body 30 with a right hand, the manipulation part 710 may be disposed to the left of the handle body 30.

Therefore, the user may easily manipulate the manipulation part 710 with a left hand which does not grip the handle body 30.

The manipulation part 710 may move in a direction parallel to a cyclone flow axis A1 of the first cyclone part 110. For example, the cyclone flow axis A1 of the first cyclone part 110 may extend in a vertical direction in a state where the dust container 112 is located on a floor.

Therefore, the manipulation part 710 may move in a vertical direction in a state where the dust container 112 is located on the floor.

A slot 310 may be provided in the handle body 30, for movement of the manipulation part 710. The slot 310 may extend in a direction parallel to an extension direction of the cyclone flow axis A1 of the first cyclone part 110.

In the present embodiment, the extension direction of the cyclone flow axis A1 may be a vertical direction in the drawing for example, and thus, it may be understood that "vertical direction" described below denotes the extension direction of the cyclone flow axis A1.

Referring to FIG. 2, a diameter D1 of the main body 2 may be set to be longer than a horizontal length L1 of the handle part 3. The handle part 3 may be coupled to the main body 2 so that a horizontal center of the handle part 3 matches a center of the main body 2.

The manipulation part 710 may be disposed at, for example, a boundary portion where the main body 2 contacts the handle part 3.

Based on a difference between a diameter of the main body 2 and a horizontal length of the handle part 3, when the cleaner 1 is laid in order for the main body 2 and the handle part 3 to contact a floor F, a space may be provided between an outer circumference surface of the main body 2, an outer circumference surface of the handle part 3, and the floor F, and the manipulation part 710 may be disposed in the space.

In this state, the manipulation part 710 may be apart from the floor F. Therefore, the manipulation part 710 may be prevented from being damaged or undesirably manipulated due to a collision between the manipulation part 710 and the floor F in the middle of laying the cleaner 1 on the floor F.

The transfer part 720 may be provided in a cylindrical bar shape for example, and the manipulation part 710 may be coupled to an upper end portion of the transfer part 720. That is, the transfer part 720 may include a horizontal cross-sectional surface provided in a circular shape.

Moreover, the transfer part 720 may extend in a direction parallel to the extension direction of the cyclone flow axis A1 of the first cyclone part 110.

Since the movable part 730 is disposed in the main body 2 and the manipulation part 710 is disposed outside the main body 2, a portion of the transfer part 720 may be disposed outside the main body 2 in order for the movable part 730 to be connected to the manipulation part 710, and another portion of the transfer part 720 may be disposed in the main body 2. That is, the transfer part 720 may pass through the main body 2. Also, a portion, disposed outside the main body 2, of the transfer part 720 may be covered by the handle part 3.

The main body 2 may further include a guide body 180 for guiding the transfer part 720. The guide body 180, for example, may be disposed outside the first body 10 to protrude.

The guide body 180 may extend in a direction parallel to the extension direction of the cyclone flow axis A1 of the first cyclone part 110.

The guide body 180 may communicate with an internal space of the first body 10, and the transfer part 720 may move in the guide body 180.

A detailed structure of the guide body 180 will be described below in detail with reference to the drawings.

The main body 2 may further include a suction motor 220 for generating a suction force. The suction force generated by the suction motor 220 may be applied to the suction part 5.

The suction motor 220 may be disposed in the second body 20.

The suction motor 220 may be disposed above the dust container 112 and the battery 600 with respect to the extension direction of the cyclone flow axis A1 of the first cyclone part 110. The manipulation part 720 may be disposed at the same height as a portion of the suction motor 220, or may be disposed to be higher than the suction motor 220.

The main body 2 may further include an air guide 170 for guiding air, discharged from the second cyclone part 140, to the suction motor 220.

The second cyclone part 140 may be coupled to a lower portion of the air guide 170. The filter part 130 may surround the second cyclone part 140 with being coupled to the second cyclone part 140.

Therefore, the filter part 130 may be disposed under the air guide 170. The movable part 730 may be disposed at a position surrounding the air guide 170 in a state where the manipulation part 710 is not manipulated.

The movable part 730 may include a cleaning part 740 for cleaning the filter part 130.

In the present embodiment, a position of the compression mechanism 70 in a state where the manipulation part 710 is not manipulated may be referred to as a standby position.

At the standby position of the compression mechanism 730, the whole of the cleaning part 740 may be disposed not to overlap the filter part 130 in a direction in which air passes through the filter part 130.

For example, the whole of the cleaning part 740 may be disposed to be higher than the filter part 130 at the standby position. Accordingly, at the standby position, the cleaning part 740 may be prevented from acting as a flow resistor in a process where air passes through the filter part 130.

A dust guide 160 may be provided under the second cyclone part 140. A lower portion of the second cyclone part 140 may be coupled to an upper portion of the dust guide 160. Also, a lower portion of the filter part 130 may be seated on the dust guide 160.

The lower portion of the dust guide 160 may be seated on the body cover 114. The dust guide 160 may be apart from an inner circumference surface of the first body 10 and may divide an internal space of the first body 10 into a first dust storage part 120 which stores dust separated from the first cyclone part 110 and a second dust storage part 122 which stores dust separated from the second cyclone part 140.

The inner circumference surface of the first body 10 and an outer circumference surface of the dust guide 160 may define the first dust storage part 120, and an inner circumference surface of the dust guide 160 may define the second dust storage part 122.

<Compression Mechanism>

Hereinafter, the compression mechanism 70 will be described in detail.

Figure 6:
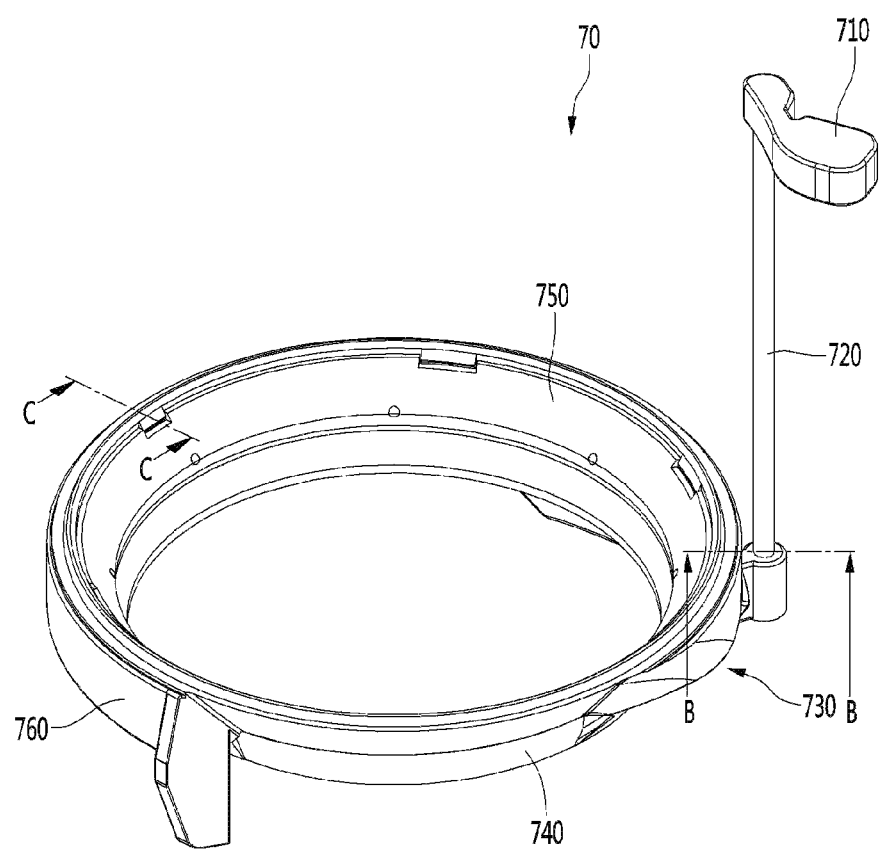
FIGS. 6 and 7 are perspective views of a compression mechanism according to an embodiment.
Figure 7:
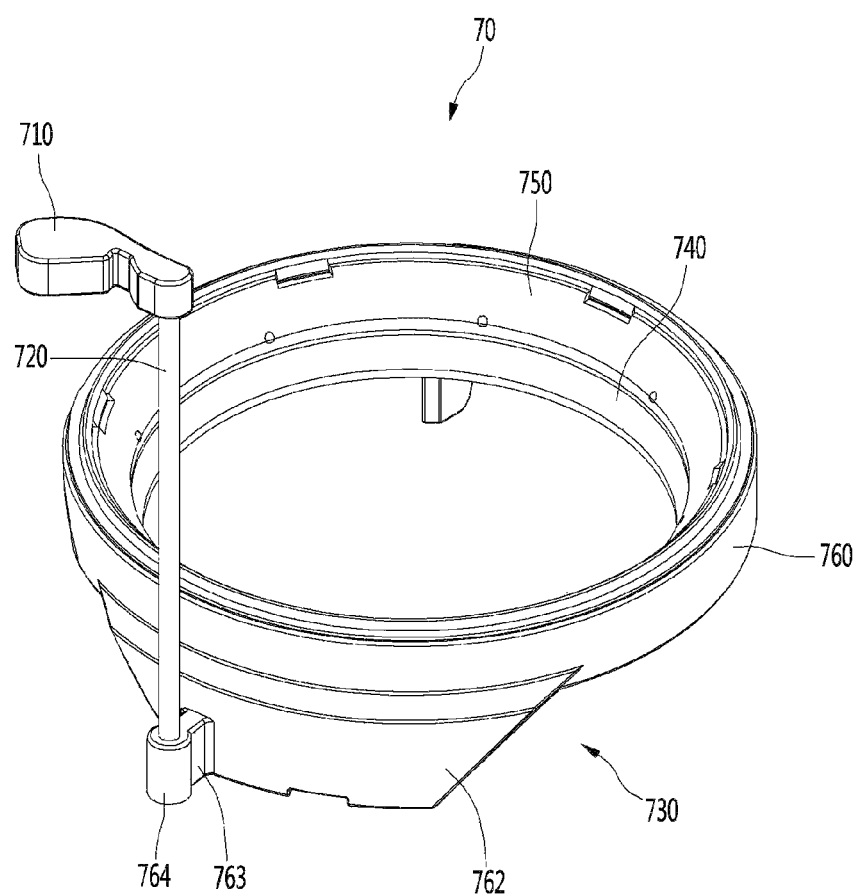
Figure 8:
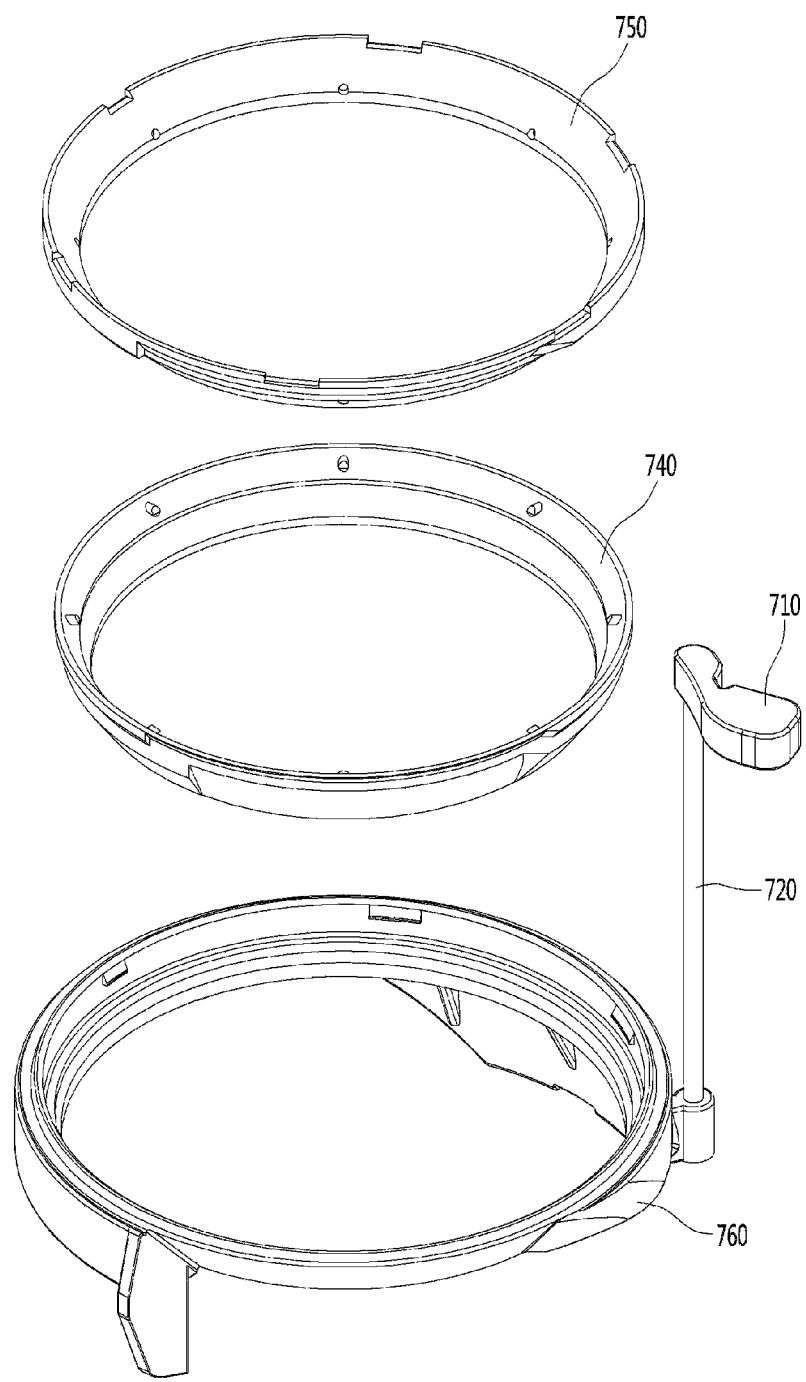
FIG. 8 is an exploded perspective view of a compression mechanism according to an embodiment.

FIGS. 6 and 7 are perspective views of a compression mechanism according to an embodiment, and FIG. 8 is an exploded perspective view of a compression mechanism according to an embodiment.

Figure 9:
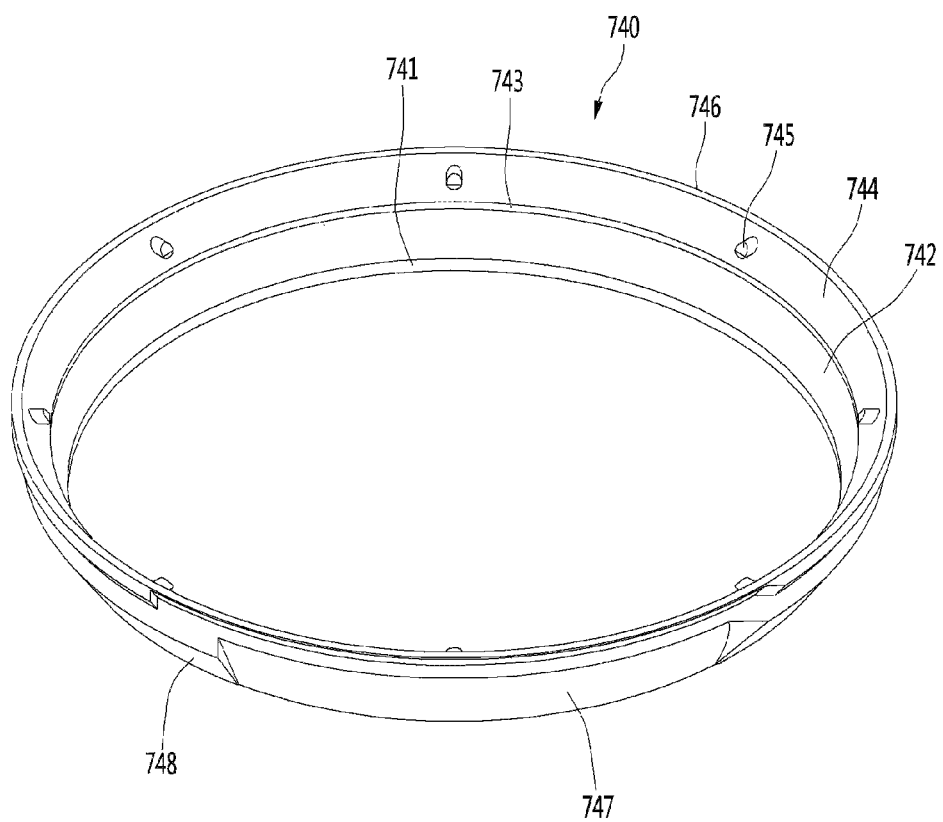
FIG. 9 is a perspective view of a cleaning part according to an embodiment.
Figure 10:
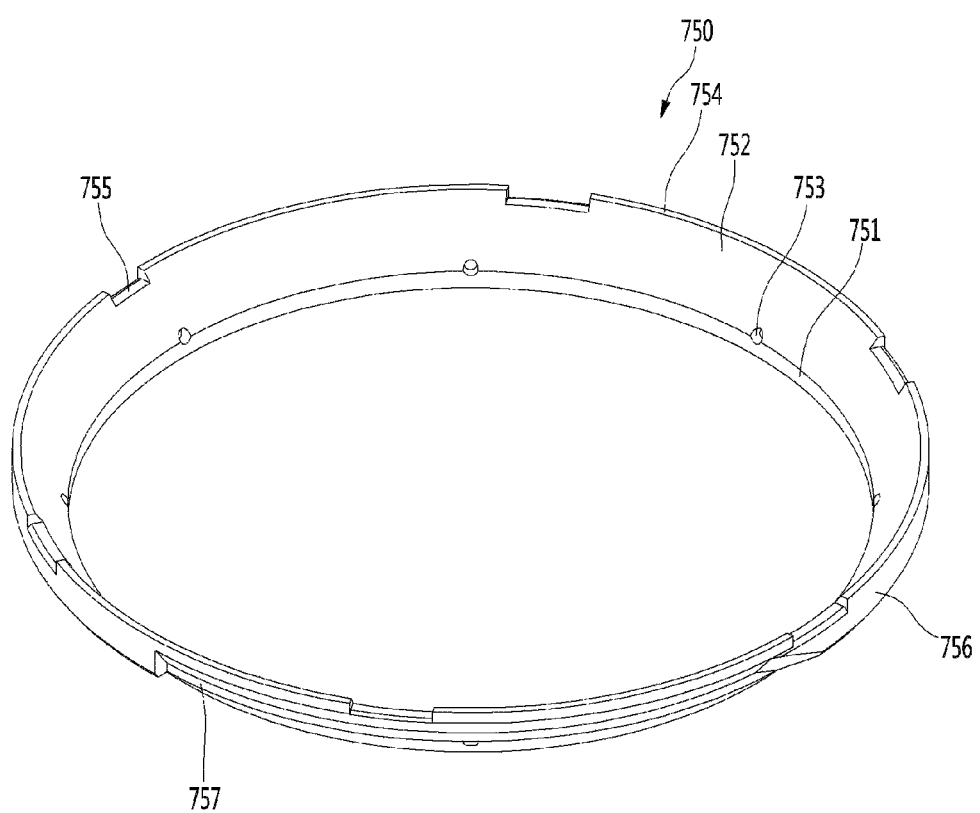
FIG. 10 is a perspective view of a core part according to an embodiment.
Figure 11:
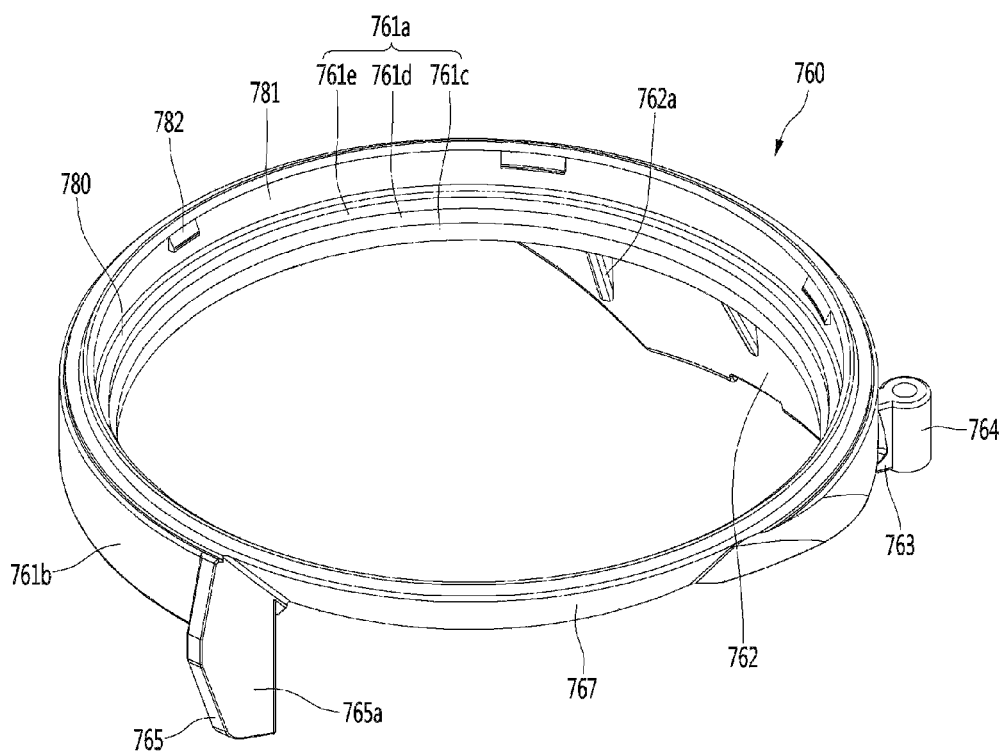
FIG. 11 is a perspective view when a frame according to an embodiment is seen from above.
Figure 12:
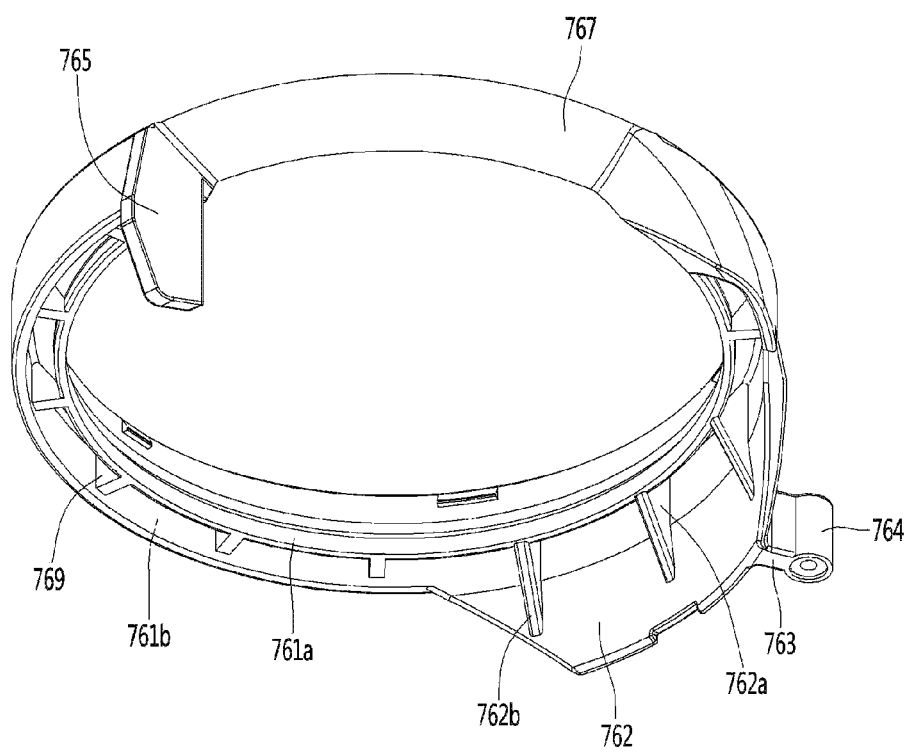
FIG. 12 is a perspective view when a frame according to an embodiment is seen from below.

FIG. 9 is a perspective view of a cleaning part according to an embodiment, FIG. 10 is a perspective view of a core part according to an embodiment, FIG. 11 is a perspective view when a frame according to an embodiment is seen from above, FIG. 12 is a perspective view when a frame according to an embodiment is seen from below.

Figure 13:
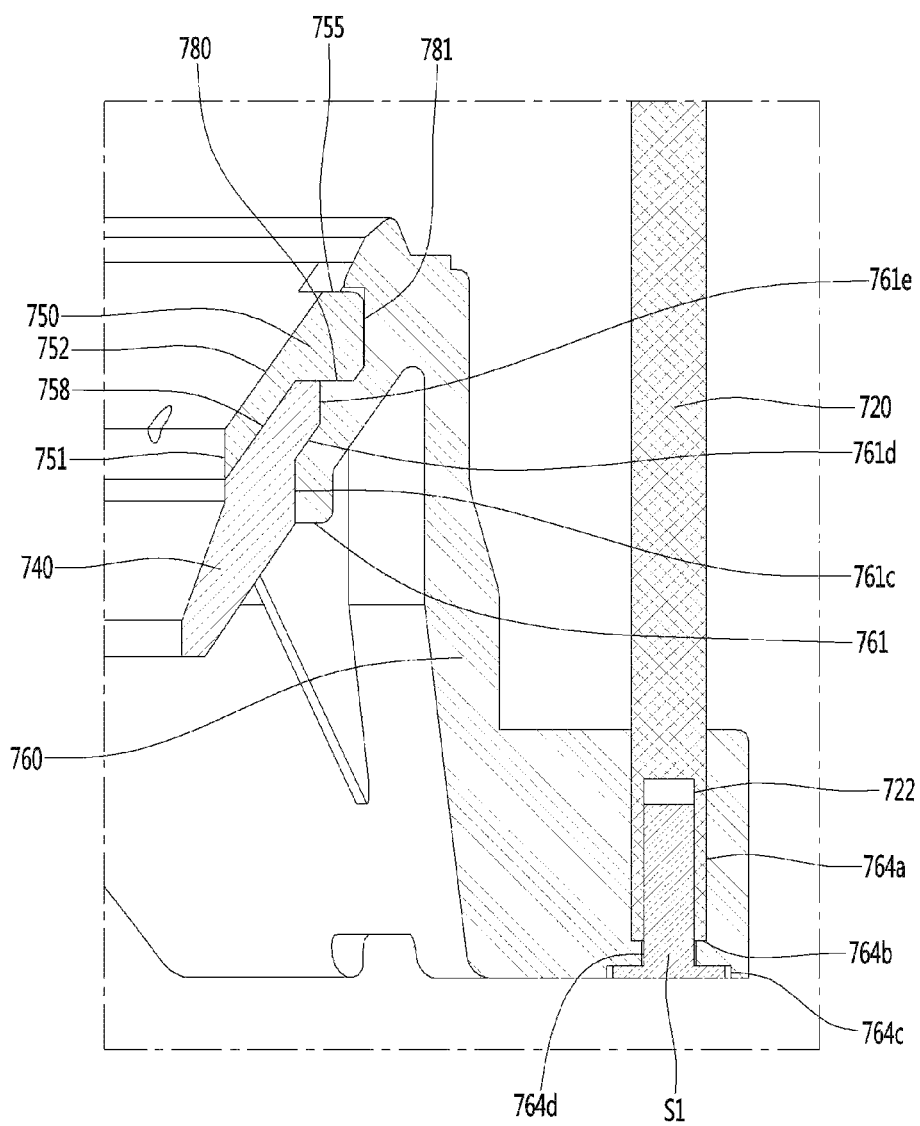
FIG. 13 is a cross-sectional view taken along line B-B of FIG. 6.
Figure 14:
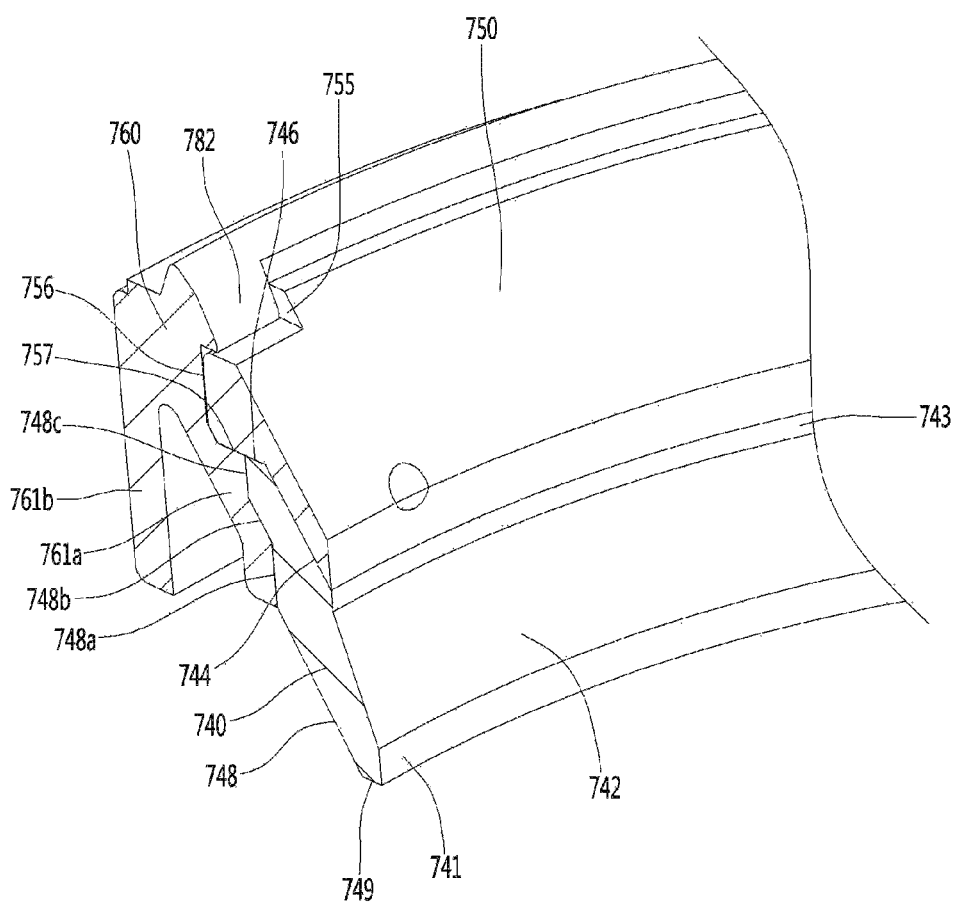
FIG. 14 is a cross-sectional view taken along line C-C of FIG. 6.

FIG. 13 is a cross-sectional view taken along line B-B of FIG. 6, and FIG. 14 is a cross-sectional view taken along line C-C of FIG. 6.

Referring to FIGS. 6 to 14, the movable part 730 may include a cleaning part 740 for cleaning the filter part 130, a frame 760 for supporting an outer perimeter of the cleaning part 740, and a core part 750 for supporting an inner perimeter of the cleaning part 740.

<Cleaning Part>

The cleaning part 740 may be formed of an elasticity-deformable material. For example, the cleaning part 740 may be formed of a rubber material. The cleaning part 740 may be provided in a ring shape in order for the cleaning part 740 to clean a whole perimeter of the filter part 130. As another example, the cleaning part 740 may be formed of silicon or a fiber material.

Moreover, the cleaning part 70 may stand by at a position deviating from the filter part 130 at the standby position, and in a cleaning process, the cleaning part 740 may move while cleaning an outer surface of the filter part 130.

The cleaning part 740 may include an inner circumference surface, an outer circumference surface, a lower surface 749, and an upper surface 746.

An inner circumference surface of the cleaning part 740 may include a cleaning surface 741 which contacts the outer surface of the filter part 130 in a cleaning process. The cleaning surface 741 may be a surface facing the filter part 130 and may be a vertical surface.

Therefore, when the cleaning part 740 is lowered in a state where the whole of the cleaning surface 741 contacts a circumference perimeter of the filter part 130, the cleaning surface 741 may remove dust adhered to the outer surface of the filter part 130.

The lower surface 749 may be a horizontal surface, and the cleaning surface 741 may extend upward from an inner end portion of the lower surface 749. Accordingly, the lower surface 749 may be vertical to the cleaning surface 741.

As described above, when the cleaning surface 741 is a vertical surface and the lower surface 749 is provided as a horizontal surface vertical to the cleaning surface 741, a phenomenon where a boundary portion between the cleaning surface 741 and the lower surface 749 is inward rolled by friction with the filter part 130 may be prevented in a process where the cleaning part 740 is lowered and then raised.

When the cleaning surface 741 and the lower surface 749 are inward rolled, a contact area between the cleaning surface 741 and the filter part 130 may be reduced, and thus, the cleaning performance of the filter part 130 may be reduced by the cleaning surface 741. However, according to the present embodiment, such a phenomenon may be prevented.

A diameter of the cleaning surface 741 may be set to be less than that of the filter part 130. In the present embodiment, since the cleaning part 740 is formed of an elasticity-deformable material, the cleaning part 740 may be deformed to the outside of the filter part 130 in a radius direction of the filter part 130 in a process where the cleaning part 740 is lowered and thus the cleaning surface 741 contacts the filter part 130, and in an elasticity-deformed state, the cleaning surface 741 may contact the filter part 130.

That is, the cleaning surface 741 may compress the filter part 130 with contacting the filter part 130. Since the cleaning surface 741 compresses the filter part 130 with contacting the filter part 130, dust adhered to the filter part 130 may be effectively removed from the filter part 130.

Moreover, since the cleaning part 740 is formed of an elasticity-deformable material and the whole perimeter of the cleaning surface 741 compresses the filter part 130, even when a center of the cleaning part 740 is inclined with respect to the cyclone flow axis A1 in a process of lowering the cleaning part 740, a state where the cleaning surface 741 of the cleaning part 740 compresses the filter part 130 may be maintained, and thus, the filter part 130 may be cleaned.

A vertical length of the cleaning surface 741 may be set to be longer than a radius-direction length (a horizontal length in the drawing) of the lower surface 749 so that the cleaning performance of the filter part 130 is enhanced and elastic deformation is well performed in the cleaning surface 741 of the cleaning part 740.

The inner circumference surface of the cleaning part 740 may further include a first inner inclined surface 742 which slopingly extends upward from an upper end of the cleaning surface 741 to the outside in a radius direction thereof.

Since the first inner inclined surface 742 is upward inclined to the outside, an inner diameter of the first inner inclined surface 742 in the cleaning part 740 may increase in a direction closer to an upper portion. The first inner inclined surface 742 may be apart from an outer circumference surface of the filter part 730.

The outer circumference surface of the cleaning part 740 may further include a first outer inclined surface 748 which extends to be upward inclined from an outer end portion of the lower surface 749 to the outside in a radius direction thereof.

In this case, an inclined angle of the first outer inclined surface 748 may be greater than an inclined angle of the first inner inclined surface 742 with respect to a vertical line.

Therefore, as seen from a vertical cross-sectional surface, a thickness between the first inner inclined surface 742 and the first outer inclined surface 748 in the cleaning part 740 may be reduced in a direction closer to a lower portion.

This may be for enabling the elasticity deformation of the cleaning part 740 to be well performed in a process of attaching the cleaning surface 741 on the filter part 730 in the cleaning part 740.

The inner circumference surface of the cleaning part 740 may further include an inner vertical surface 743 which vertically extends from the first inner inclined surface 742.

The inner vertical surface 743 may determine a position of a lower end portion of the core part 750 in a process of coupling the core part 750 to the cleaning part 740 through double injection.

The outer circumference surface of the cleaning part 740 may further include a first outer vertical surface 748a which vertically extends upward from an upper end portion of the first outer inclined surface 748.

A length of the first outer vertical surface 748a may be set to be longer than that of the inner vertical surface 743. The inner vertical surface 743 may be disposed to face the first outer vertical surface 748.

A thickness between the first outer vertical surface 748a and the inner vertical surface 743 in the cleaning part 740 may be thickest. This may be for maintaining a coupled state between the frame 760 and the core part 750 without deformation of a portion between the first outer vertical surface 748a and the inner vertical surface 743 in the cleaning part 740.

The inner circumference surface of the cleaning part 740 may further include a second inner inclined surface 744 which is upward inclined from an upper end of the inner vertical surface 743 to the outside in a radius direction thereof.

The outer circumference surface of the cleaning part 740 may further include a second outer inclined surface 748b which is upward inclined from an upper end of the first outer inclined surface to the outside in a radius direction thereof.

An inclined angle of the second inner inclined surface 744 may be substantially the same as that of the second outer inclined surface 748b. Also, an inclined angle of the second inner inclined surface 744 may be substantially the same as that of the first outer inclined surface 748a.

The outer circumference surface of the cleaning part 740 may further include a second outer vertical surface 748c which vertically extends upward from an upper end of the second outer inclined surface 748b.

An upper end of the second outer vertical surface 748c may be connected to an upper end of the second inner inclined surface 744 by the upper surface 746.

The upper end of the second outer vertical surface 748b and the upper end of the second inner inclined surface 744 may be disposed at the same height. Therefore, the upper surface 746 of the cleaning part 740 may be a horizontal surface.

A coupling projection 745 which is to be coupled to the core part 750 may be provided on the second inner inclined surface 744.

A plurality of coupling projections 745 may be arranged apart from one another in a circumference direction of the cleaning part 740 so that a coupling force between the core part 750 and the cleaning part 740 increases.

Each of the coupling projections 745 may protrude from the second inner inclined surface 744 in a horizontal direction. That is, an extension direction of the coupling projection 745 may form a certain angle with respect to a normal line of the second inner inclined surface 744.

In a case where the coupling projection 745 extends from the second inner inclined surface 744 in the horizontal direction, the coupling projection 745 may be effectively prevented from being detached from the core part 750 in a process where the cleaning part 740 moves in a vertical direction.

A portion of the first outer inclined surface 748 in the cleaning part 740 may be recessed inward. For example, the first outer inclined surface 748 may include a recessed portion 747.

A function and a position of the recessed portion 747 will be described below with reference to the drawings.

<Core Part>

The core part 750 may contact a portion of each of the upper surface 746 and the inner circumference surface of the cleaning part 740.

For example, the core part 750 may include an outer inclined surface 758 which contacts the second inner inclined surface 744 of the cleaning part 740.

The outer inclined surface 758 may be upward inclined to the outside in a radius direction thereof as a lower portion thereof is closer to an upper portion thereof.

An inclined angle of the outer inclined surface 758 may be the same as that of the second inner inclined surface 744 of the cleaning part 740. The whole of the outer inclined surface 758 may contact the second inner inclined surface 744.

The core part 750 may further include an inner vertical surface 751 which vertically extends upward from a lower end of the outer inclined surface 758. The inner vertical surface 751 may be aligned with the inner vertical surface 743 of the cleaning part 740 in a vertical direction.

For example, the inner vertical surface 751 of the core part 750 and the inner vertical surface 743 of the cleaning part 740 may each be a surface which is continuous in a vertical direction.

The core part 750 may further include an inner inclined surface 752 which is upward inclined from an upper end of the inner vertical surface 751 to the outside. An inclined angle of the inner inclined surface 752 may be substantially the same as that of the outer inclined surface 758.

The core part 750 may further include a coupling hole 753 into which the coupling projection 745 of the cleaning part 740 is inserted. For example, a plurality of coupling holes 753 may be disposed apart from one another in a circumference direction of the core part 750.

The plurality of coupling holes 753 may pass through the core part 750 in a horizontal direction. That is, an extension direction of the coupling hole 753 may form a certain angle with respect to a normal line of each of the outer inclined surface 758 and the inner inclined surface 752.

A portion of each of the coupling holes 753 may pass through the outer inclined surface 758 and the inner inclined surface 752, and another portion may pass through the outer inclined surface 758 and the inner vertical surface 743.

The core part 750 may further include a horizontal surface 757 which horizontally extends outward from an end portion of the outer inclined surface 758.

A radius-direction length of the horizontal surface 757 may be longer than that of the upper surface 746 of the cleaning part 740.

The horizontal surface 757 of the core part 750 may contact the upper surface 746 of the cleaning part 740. In this case, a front surface of the upper surface 746 of the cleaning part 750 may contact the horizontal surface 757 of the core part 750.

The core part 750 may further include an outer vertical surface 756 which vertically extends upward from an outer end portion of the horizontal surface 757.

An upper surface 754 of the core part 750 may connect an upper end of the outer vertical surface 756 to an upper end of the inner inclined surface 752.

In this case, the upper end of the outer vertical surface 756 and the upper end of the inner inclined surface 752 may be disposed at the same height. Therefore, the upper surface 754 of the core part 750 may be a horizontal surface.

The core part 750 may further include a hook coupling slot 755 to which a coupling hook 782 of the frame 760 is to be coupled.

A plurality of hook coupling slots 755 may be arranged apart from one another in a circumference direction of the core part 750 so that a fastening force between the core part 750 and the frame 760 increases.

Each of the hook coupling slots 755 may be formed as the upper surface 754 of the core part 750 is recessed downward. Alternatively, each hook coupling slot 755 may be provided to pass through an upper portion of the outer vertical surface 756 and an upper portion of the inner inclined surface 752.

In all cases, the coupling hook 782 of the frame 760 may be seated on a floor surface of each hook coupling slot 755.

The core part 750 may further include a recessed portion 757 which is provided at a position corresponding to the recessed portion 747.

<Frame>

The frame 760 may support the cleaning part 740 and may be coupled to the core part 750 to fix a position of the cleaning part 740.

The frame 760 may include an inner body 761*a* which supports the cleaning part 740 and an outer body 761*b* which extends downward from an upper portion of the inner body 761*a* and is disposed outside the inner body 761*a*.

The inner body 761*a* may be wholly provided to be inclined to the outside in a radius direction thereof as a lower portion thereof is closer to an upper portion thereof, and the outer body 761*b* may have a shape which vertically extends from an upper portion to a lower portion of the inner body 761*a*.

The inner body 761*a* may include an inner body bottom 761. The inner body bottom 761 may be, for example, a horizontal surface.

The inner body 761*a* may include a first inner vertical surface 761*c* which vertically extends upward from an inner end portion of the inner body bottom 761. The first inner vertical surface 761*c* may contact the first outer vertical surface 748*a* of the cleaning part 740.

The inner body bottom 761 may be disposed to be higher than the lower surface 749 of the cleaning part 740. Therefore, in terms of the whole of the movable part 730, the lower surface 749 of the cleaning part 740 may be disposed at a lowermost portion.

The inner body 761a may further include a first inner inclined surface 761d which is upward inclined from an upper end of the first inner vertical surface 761c to the outside in a radius direction thereof.

Moreover, the inner body 761a may further include a second inner vertical surface 761e which vertically extends upward from an upper end of the first inner inclined surface 761d.

Moreover, the inner body 761a may further include a horizontal surface 780 which horizontally extends outward from an upper end of the second inner vertical surface 761e.

The second outer inclined surface 748b of the cleaning part 740 may be seated on the first inner inclined surface 761d.

The second outer vertical surface 748c of the cleaning part 740 may contact the second inner vertical surface 761e.

The horizontal surface 780 of the inner body 761a may be disposed at the same height as the upper end 749 of the cleaning part 740.

Therefore, the horizontal surface 757 of the core part 750 may be seated on the horizontal surface 780 of the inner body 761a and the upper surface 749 of the cleaning part 740.

That is, a portion of the inner body 761a and a portion of the core part 750 may be coupled to each other to surround a portion of an upper portion of the cleaning part 740.

The inner body 761a may further include a second inner vertical surface 781 which vertically extends upward from an outer end portion of the horizontal surface 780.

The second inner vertical surface 781 of the inner body 761a may contact the outer vertical surface 756 of the core part 750. In this case, a vertical length of the second inner vertical surface 781 may be set to be longer than that of the outer vertical surface 756 of the core part 750.

Therefore, the whole of the outer vertical surface 756 of the core part 750 may contact the second inner vertical surface 781.

The coupling hook 782 may be coupled to the second inner vertical surface 781 of the inner body 761a. The plurality of coupling hooks 782 may be disposed apart from one another in a circumference direction thereof from the second inner vertical surface 781.

Each coupling hook 782 may protrude inward from an upper portion of the second inner vertical surface 781.

Therefore, according to the present embodiment, the upward movement of an upper portion of the core part 750 may be limited by the coupling hook 782, and the downward movement of a lower portion of the core part 750 may be limited by the horizontal surface 780 of the inner body 761a.

The outer body 761b may be disposed outside the inner body 761a, and in this case, may surround a portion of the inner body 761a without surrounding the whole of the inner body 761a.

In this case, a portion where the outer body 761b is not provided may be a portion adjacent to the suction part 5 in the main body 2.

A recessed portion 767 recessed inward may be provided at a portion, which is not surrounded by the outer body 761b, of the inner body 761a. The recessed portion of the inner body 761a may be provided at a position at which the recessed portion 757 of the core part 750 corresponds to the recessed portion 747 of the cleaning part 740.

A height of a portion, where the recessed portion 767 is provided, of the inner body 761a may be lower than that of a portion, where the recessed portion 767 is not provided, of the inner body 761a.

At least some of the recessed portions 767, 757, and 747 in the movable part 730 may be disposed to face the suction part 5 and may be recessed in a direction distancing from the suction part 5.

The inner body 761a and the outer body 761b may be connected to each other by one or more connection ribs 769 so as to prevent relative deformation between the inner body 761a and the outer body 761b from being performed due to a reaction occurring in a process where the movable part 730 is lowered to compress dust in the dust container 112.

The frame 760 may further include a frame guide 765 which extends downward from a boundary portion between the inner body 761a and the outer body 761b.

A vertical length of the frame guide 765 may be set to be longer than that of each of the inner body 761s and the outer body 761b. A lower end of the frame guide 765 may be disposed to be lower than the inner body 761a and the outer body 761b.

The frame guide 765 may include a guide surface 765a which is a flat surface. The guide surface 765a may guide spiral air flow in a process where air flows into the first cyclone part 110 through the suction part 5. Disposition of the frame guide 765 will be described below with reference to the drawings.

A lower end of the frame guide 765 may be disposed to be lower than the inner body 761a and the outer body 761b, and thus, the frame guide 765 may downward pressurize dust stored in the dust container 112 in a process where the movable part 730 is lowered.

The frame 760 may further include a pressurization rib 762 which extends downward from the outer body 761b. The pressurization rib 762 may be provided to be rounded in a circumference direction thereof. The pressurization rib 760 may be disposed at a position opposite to the frame guide 765 with respect to a center of the frame 760.

The pressurization rib 762 may downward pressurize the dust stored in the dust container 112 in a process of lowering the movable part 730.

In this case, the pressurization rib 762 may be provided in a thin plate shape, and thus, a pressurization area where the pressurization rib 762 pressurizes dust may be narrow. Therefore, the frame 760 may further include one or more auxiliary ribs 762a which protrudes inward from an inner circumference surface of the pressurization rib 762, for increasing a dust-compressing area.

In order to more increase a dust compression effect, the plurality of auxiliary ribs 762a may be disposed apart from one another in a circumference direction from the pressurization rib 762.

Each of the auxiliary ribs 762a may extend from a portion under the connection rib 769, or may connect the inner body 761a to the outer body 761b independently from the connection rib 769 and may extend to the pressurization rib 762.

The auxiliary rib 762a may include an inclined surface 762b so as not to hinder flow of air at the standby position but to compress dust.

For example, the inclined surface 762b may be downward inclined from the auxiliary rib 762a to the outside in a radius direction thereof. That is, a protrusion length of the auxiliary rib 762b may be reduced in a direction closer to a lower portion thereof.

Moreover, a lower end of the auxiliary rib 762b may be disposed to be higher than a lower end of the pressurization rib 762.

The frame 760 may further include an extension part 763 which extends outward from the pressurization rib 762 and a coupling part 764 which is provided in the extension part 763.

In the present embodiment, the extension part 763 and the coupling part 764 may be referred to as a connection part for connecting the transfer part 720 to the frame 760.

The transfer part 720 may be connected to the coupling part 764.

The extension part 763, for example, may extend outward from a lowermost portion of an outer circumference surface of the pressurization rib 762. In this case, an extension line of the extension part 763 may pass through a center of the frame 760.

Therefore, a moment may be prevented from occurring in a process where the manipulation force of the manipulation part 710 is transferred to the frame 760 by the transfer part 720.

A horizontal thickness of the extension part 763 may be set to be less than a diameter of the coupling part 764.

The coupling part 764 may be approximately cylindrical in shape. An accommodating groove 764a for accommodating the transfer part 720 may be provided in the coupling part 764. The accommodating groove 764a may be recessed downward from an upper surface of the coupling part 764.

The transfer part 720, as described above, may be provided in a long bar shape which is a cylindrical shape. This may be for enabling the transfer part 720 to smoothly move in a process where the transfer part 720 moves in a state which passes through the guide body 180.

Therefore, a lower end of the transfer part 720 may be inserted into the accommodating groove 764a at an upper portion of the coupling part 764.

The coupling part 764 may further include a seating surface 764b on which a lower end of the transfer part 720 accommodated into the accommodating groove 764a is seated.

A fastening member S1 may be fastened to the transfer part 720 at a lower portion of the coupling part 764 in a state where the transfer part 750 is accommodated into the accommodating groove 764a and is seated on the seating surface 764b. The fastening member S1 may be, for example, a bolt.

An accommodating groove 764c to receive a head of the bolt accommodated thereinto may be provided in a floor of the coupling part 764. Also, a fastening groove 722 to which the fastening member S1 is fastened may be provided in the transfer part 720.

Therefore, the fastening member S1 may pass through a fastening hole 764d passing through the accommodating groove 764c and the seating surface 764b and may be fastened to the fastening groove 722 of the transfer part 720.

The transfer part 720 may be apart from an outer circumference surface (an outer circumference surface of an outer body) of the frame 760 in a state where the transfer part 720 is coupled to the coupling part 764.

In the present embodiment, the cleaning part 740 may be provided as one body with the core part 750 and the frame 760 through double injection.

Figure 15:
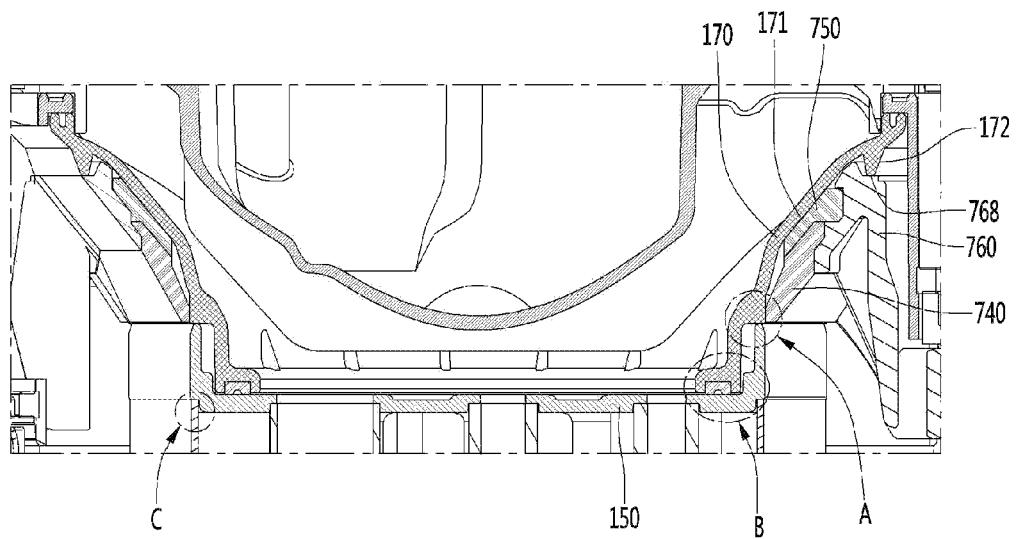
FIG. 15 is a diagram illustrating a state where a movable part according to an embodiment is located at a standby position.
Figure 16:
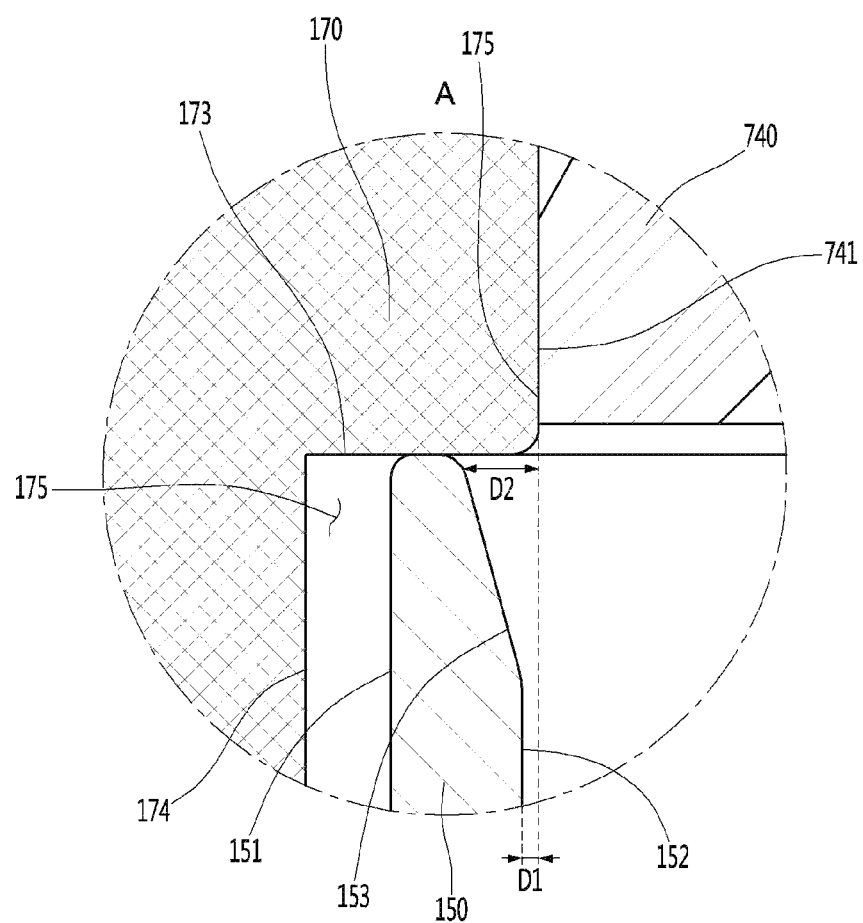
FIG. 16 is an enlarged view of a portion A of FIG. 15.

FIG. 15 is a diagram illustrating a state where a movable part according to an embodiment is located at a standby position, and FIG. 16 is an enlarged view of a portion A of FIG. 15.

Referring to FIGS. 15 and 16, the movable part 730 may be disposed to surround an outer perimeter of the air guide 170 at the standby position.

In this case, an outer circumference surface of the air guide 170 may form an accommodating space 171 which is recessed inward, so as to minimize a degree to which the movable part 730 protrudes outward in a state which surrounds an outer portion of the air guide 170.

A portion of the movable part 730 may be accommodated into the accommodating space 171.

An outer circumference surface of the air guide 170 may further include a contact surface 175 which contacts the cleaning surface 741 of the cleaning part 740. The contact surface 175 may be disposed under the accommodating space 171 of the outer circumference surface of the movable part 730.

In this case, the contact surface 175 may be a vertical surface which is disposed to face the cleaning surface 741. A vertical length of the contact surface 175 may be set to be longer than that of the cleaning surface 741.

Therefore, the whole of the cleaning surface 741 may contact the contact surface 175 at the standby position.

In the present embodiment, an outer diameter of a portion, where the contact surface 175 is provided, of the air guide 170 may be set to be greater than an inner diameter of a portion, where the cleaning surface 741 is provided, of the cleaning part 740.

Therefore, the cleaning part 740 may be elastically deformed to the outside in a radius direction of the contact surface 175 at the standby position, and the cleaning surface 741 may contact the contact surface 175 in an elasticity-deformed state.

That is, at the standby position, since the cleaning surface 741 is in a state which compresses the contact surface 175, a frictional force between the cleaning surface 741 and the contact surface 175 may increase, and thus, the cleaning surface 741 may be prevented from sliding along the contact surface 175 in a state where the manipulation part 710 is not manipulated.

In order to prevent particles from introduced into a space between the movable part 730 and the outer circumference surface of the air guide 170 in a state where the movable part 730 is accommodated into the accommodating space 171 at the standby position, the air guide 170 may include a contact projection 172, and the frame 760 may include a projection seating groove 768 on which the contact projection 172 is seated.

The contact projection 172 may protrude downward from an upper side of the outer circumference surface of the air guide 170. The contact projection 172 may be provided continuously along a circumference direction of the air guide 170. That is, the contact projection 172 may be provided in a ring shape.

The projection seating groove 768 may be formed as an upper surface border of the frame 760 is recessed downward. The projection seating groove 768 may be provided in a ring shape in order for the contact projection 172 having a ring shape to be seated therein.

Therefore, at the standby position, the cleaning surface 741 and the projection seating groove 768 which are disposed apart from each other in a vertical direction may respectively contact the contact surface 175 and the contact projection 172 of the air guide 170.

Therefore, two contact points may prevent particles from flowing to a gap between the air guide 170 and the movable part 730.

A discharging guide 150 which guides discharging of air separated from dust in the second cyclone part 140 may be provided on the second cyclone part 140.

The discharging guide 150 may be coupled to a lower portion of the air guide 170. A coupling space 175 to which a border portion of the discharging guide 150 is to be disposed may be defined at a lower perimeter of the air guide 170

A portion of the air guide 170 may be seated on the upper surface 151 of the discharging guide 150 by the coupling space 175.

The air guide 170 may include a first surface 173 which substantially horizontally extends in a direction from a lower end of the contact surface 175 to an inner portion and a second surface 174 which substantially vertically extends downward from an inner end portion of the first surface 173.

Moreover, the first surface 173 and the second surface 174 may define the coupling space 175. The first surface 173 of the air guide 170 may be seated on the upper surface 171 of the discharging guide 150.

The discharging guide 150 may include an outer circumference surface 152. A diameter of the outer circumference surface 152 of the discharging guide 150 may be provided to be less than that of the contact surface 175 of the air guide 170 so that the cleaning part 740 is smoothly lowered without interference caused by the discharging guide 150 when the movable part 730 is lowered (a diameter difference is D1).

Moreover, the cleaning surface 741 of the cleaning part 740 may further include a taper surface 153 so that the cleaning part 740 is smoothly lowered at a time when the cleaning surface 741 deviates from the contact surface 175 of the air guide 170. The taper surface 153 may be an inclined surface which connects the upper surface 151 and the outer circumference surface 152 of the discharging guide 150. The taper surface 153 may be inclined in order for a diameter thereof to be reduced in a direction from an outer circumference surface of the discharging guide 150 to an upper portion.

In this case, a difference between a minimum diameter of the outer circumference surface 152 of the discharging guide 150 and a diameter of the contact surface 175 of the air guide 170 may be D2. That is, an upper end of the outer circumference surface of the discharging guide 170 may be recessed inward, and a recessed depth may be maximum in an upper end portion.

Therefore, when the cleaning surface 741 of the cleaning part 740 deviates from the contact surface 175 of the air guide 170, the cleaning surface 741 may restore to an original shape toward the taper surface 153 on the basis of an elastic restoring force. At this time, the cleaning surface 741 of the cleaning part 740 may contact at least a portion of the taper surface 153.

In this case, the cleaning surface 741 of the cleaning part 740 may be set to be less than a maximum diameter of the outer circumference surface 152 of the discharging guide 150.

Therefore, when the cleaning part 740 is continuously lowered in a state where the cleaning surface 741 is disposed on the taper surface 153, the cleaning surface 741 may be elastically deformed from the outer circumference surface 152 of the discharging guide 150 to the outside in a radius direction thereof and may be lowered in contact with the outer circumference surface 152 of the discharging guide 150 in an elasticity-deformed state.

Figure 17:
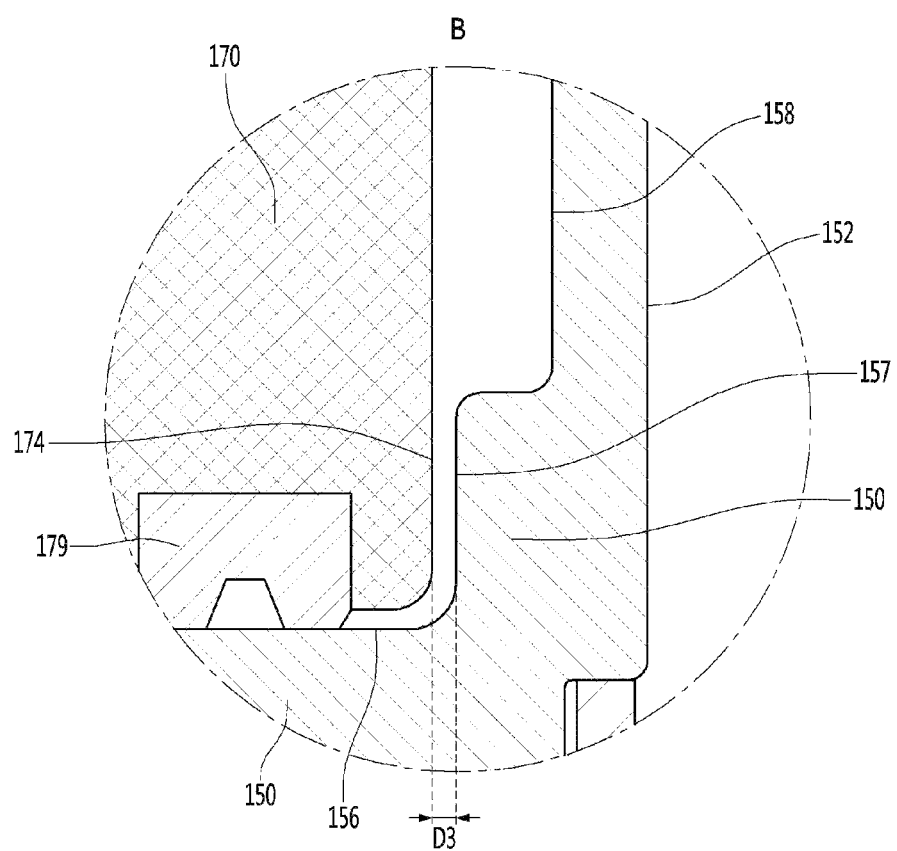
FIG. 17 is an enlarged view of a portion B of FIG. 15.

FIG. 17 is an enlarged view of a portion B of FIG. 15.

Referring to FIGS. 15 to 17, the discharging guide 150 may further include a seating surface 156 on which the air guide 170 is disposed.

In this case, a sealing member 179 may be coupled to a lower surface of the air guide 170 and may be seated on the seating surface 156.

An inner circumference surface of the discharging guide 150 may be provided to include a multi-layer and may include a first inner circumference surface 157 and a second inner circumference surface 158.

In this case, a diameter of the first inner circumference surface 157 may be less than that of the second inner circumference surface 158. The inner circumference surface of the discharging guide 150 may be provided as one inner circumference surface having a single diameter.

When the air guide 179 is seated on the discharge guide 150, the second surface 174 of the air guide 170 may face the first inner circumference surface 157 of the discharging guide 150.

Based on an assembly tolerance in a process of coupling the discharging guide 150 to the air guide 170, a diameter of the first inner circumference surface 157 may be set to be greater than that of the second surface 174 of the air guide 170.

In this case, it may be designed so that a difference D2 between a minimum diameter of the outer circumference surface 152 of the discharging guide 150 and a diameter of the contact surface of the air guide 170 is less than a difference D3 between a diameter of the first circumference surface 157 of the discharging guide 150 and a diameter of the second surface 174 of the air guide 170.

Although not limited, D3 may be 1.7 or more times D2.

When a portion of the first circumference surface 157 of the discharging guide 150 is closer to the second surface 174 of the air guide 170 as much as possible to contact due to an assembly error, a difference between a diameter of the first circumference surface 157 of the discharging guide 150 and a diameter of the second surface 174 of the air guide 170 may more increase than D3 at a portion opposite to a corresponding portion.

For example, since it is designed that D2 is greater than D3 even when a difference between a diameter of the first circumference surface 157 of the discharging guide 150 and a diameter of the second surface 174 of the air guide 170 increases, a phenomenon where a portion, having a minimum diameter, of the outer circumference surface 152 of the discharging guide 150 is disposed to protrude more outward than the contact surface 175 of the air guide 170 in a radius direction thereof is prevented.

Figure 18:
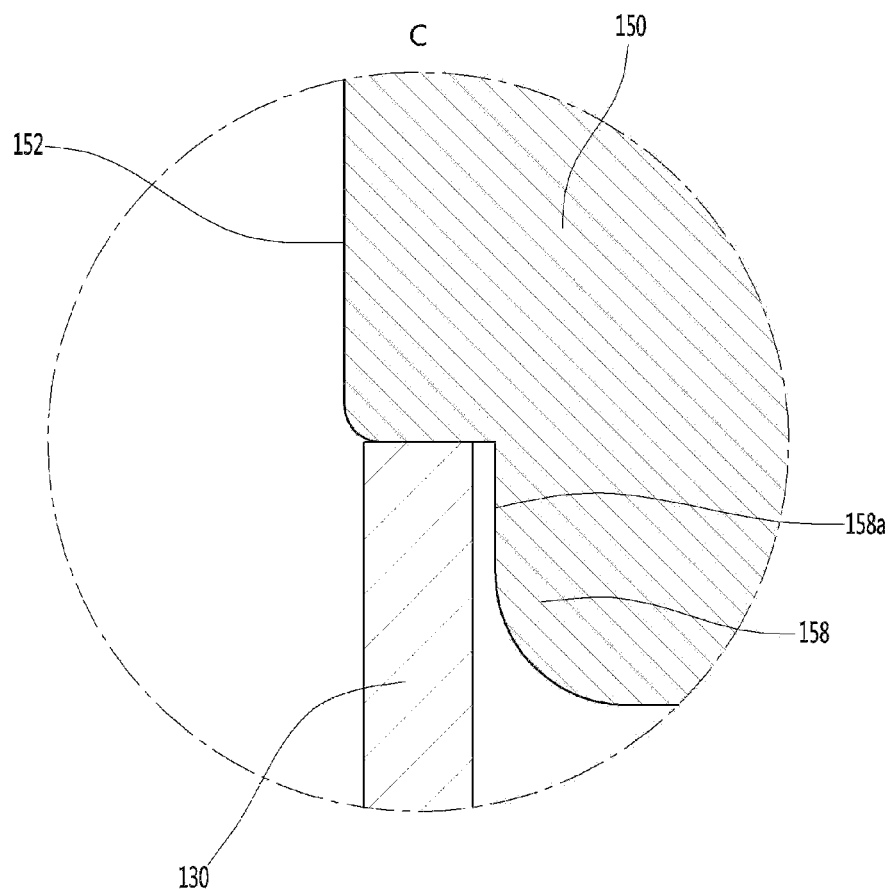
FIG. 18 is an enlarged view of a portion C of FIG. 15.

FIG. 18 is an enlarged view of a portion C of FIG. 15.

Referring to FIG. 18, a lower portion of the discharging guide 150 may be provided in a cylindrical shape, and a portion thereof may be accommodated into the filter part 130 having a cylindrical shape.

The discharging guide 150 may include an inserting part 158 inserted into the filter part 130. A diameter of the outer circumference surface 158a of the inserting part 158 may be set to be less than an inner diameter of the filter part 130 so that the inserting part 158 is inserted into the filter part 130.

A portion of the discharging guide 150 may be seated on an upper surface of the filter part 130 in a state where the inserting part 158 of the discharging guide 150 is inserted into the filter part 130.

An outer diameter of the filter part 130 may be set to be less than a diameter of the outer circumference surface 152 of the discharging guide 150 so that the cleaning surface 741 of the cleaning part 740 contacting the outer circumference surface 152 of the discharging guide 150 is smoothly lowered to the filter part 130 in a lowering process.

Therefore, the cleaning surface 741 of the cleaning part 740 may smoothly move from the outer circumference surface 152 of the discharging guide 150 to the outer surface of the filter part 130.

As described above, an outer diameter of the filter part 130 may be greater than a diameter of the cleaning surface 741.

Figure 19:
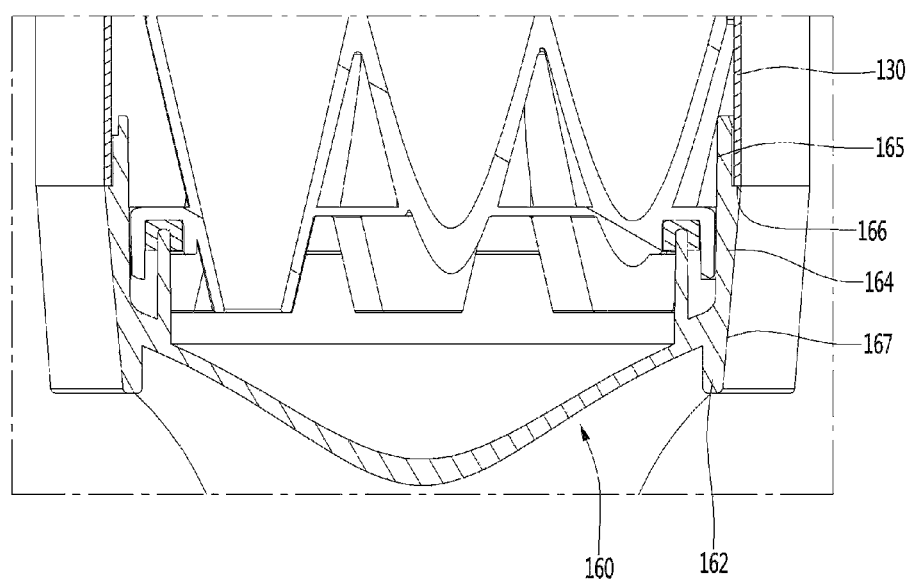
FIG. 19 is a cross-sectional view illustrating a state where a lower portion of a filter part according to an embodiment is seated on a dust guide.

FIG. 19 is a cross-sectional view illustrating a state where a lower portion of a filter part according to an embodiment is seated on a dust guide.

Referring to FIGS. 4 and 19, the dust guide 160 may include a storage wall 161 which defines the second dust storage part 122 and a supporting part 164 provided at an upper side of the storage wall 161 to support the second cyclone part 130.

The storage wall 161 may be provided in a pillar shape including a horizontal cross-sectional surface having a circular shape, and a diameter thereof may be provided to be reduced from an upper portion to a lower portion thereof so that a space of the first dust storage part 120 is maximized.

The dust guide 160 may further include an anti-scattering rib 162 which extends downward from an upper end of the storage wall 161.

The anti-scattering rib 162 may be provided in, for example, a cylindrical shape and may surround an upper portion of the storage wall 161 with being apart from the storage wall 161.

A diameter of the storage wall 161 may be reduced in a direction closer to a lower portion thereof, and thus, a space may be provided between an outer circumference surface of the storage wall 161 and the anti-scattering rib 162.

The cyclone flow may be lowered while moving along an inner circumference surface of the first body 10. When the cyclone flow reaches the body cover 114 in a process of lowering the cyclone flow, rotation movement may be changed to raising movement again.

For example, when raising movement of airflow is performed in the first dust storage part 120, there may be a problem where dust stored in the first dust storage part 120 is scattered.

In the present embodiment, raising movement of airflow in the first dust storage part 120 may be again changed to lowering movement by the anti-scattering rib 162 in a space between anti-scattering rib 162 and the storage wall 161. Therefore, scattering of the dust stored in the first dust storage part 120 may be prevented, thereby solving a problem where dust is reversely moved to the second cyclone part 140.

The anti-scattering rib 162 may extend downward from an upper end of the storage wall 161, and thus, dust separated from the first cyclone part 110 along with the cyclone flow may smoothly move to the first dust storage part 120 by using the anti-scattering rib 162.

The supporting part 164 may include an inserting part 165 inserted into a lower portion of the filter part 130. When the inserting part 165 of the supporting part 164 is inserted into the lower portion of the filter part 130, a lower end of the filter part 130 may be seated on the supporting surface 166 disposed at a perimeter of the inserting part 165 in the supporting part 164.

In a state where the filter part 130 is seated on the supporting surface 166, the cleaning part 740 may slide along the filter part 130 while descending.

In order to prevent the outer circumference surface 167 of the supporting part 164 from interfering in the cleaning part 740 in a process of lowering the cleaning part 740, the outer circumference surface 167 of the supporting part 164 may be provided to a diameter which is reduced in a direction closer to a lower portion. That is, the outer circumference surface 167 of the supporting part 164 may be inward inclined in a direction closer to a lower portion.

Moreover, a maximum diameter of the outer circumference surface of the supporting part 164 may be equal to or less than that of the outer circumference surface of the filter part 130.

Moreover, the dust stored in the first dust storage part 120 may be compressed in a process of lowering the movable part 730, and when the outer circumference surface 167 of the supporting part 164 is inclined inward, the compressed dust may be easily lowered.

The anti-scattering rib 162 may extend downward from a boundary portion between the supporting part 164 and the storage wall 161. The outer circumference surface of the anti-scattering rib 162 may be inclined to configure a surface continuous with the outer circumference surface 167 of the supporting part 164. That is, an outer diameter of the outer circumference surface of the anti-scattering rib 162 may be reduced in a direction closer to a lower portion.

Figure 20:
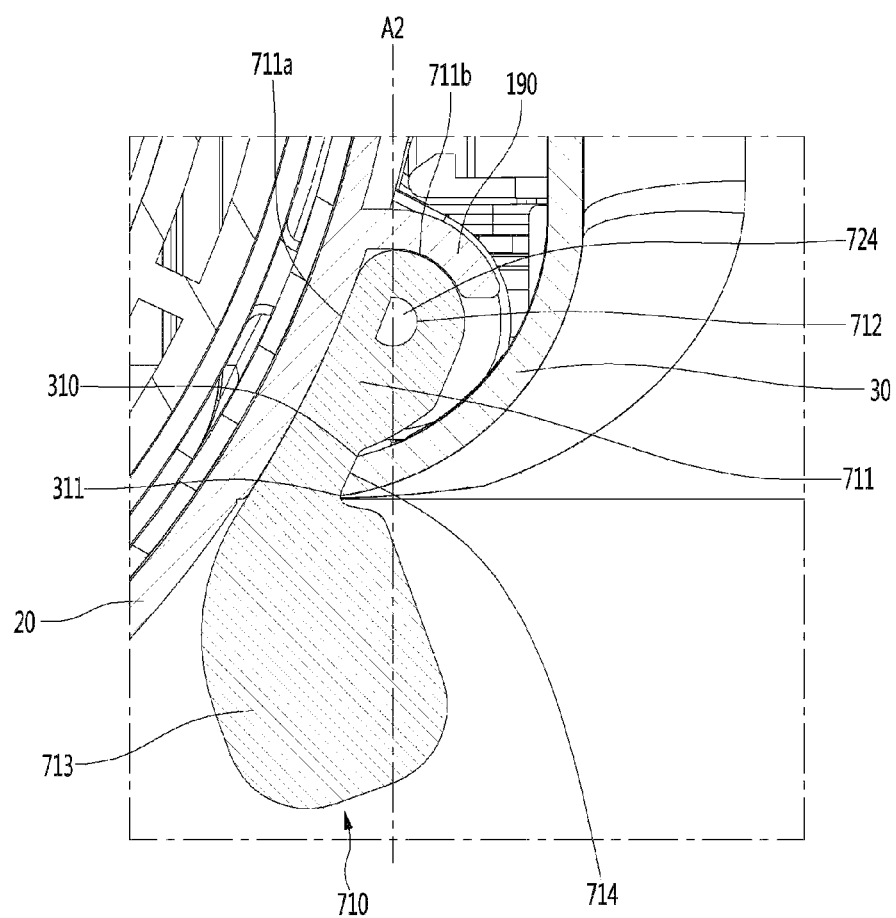
FIG. 20 is a cross-sectional view taken along line D-D of FIG. 1.
Figure 21:
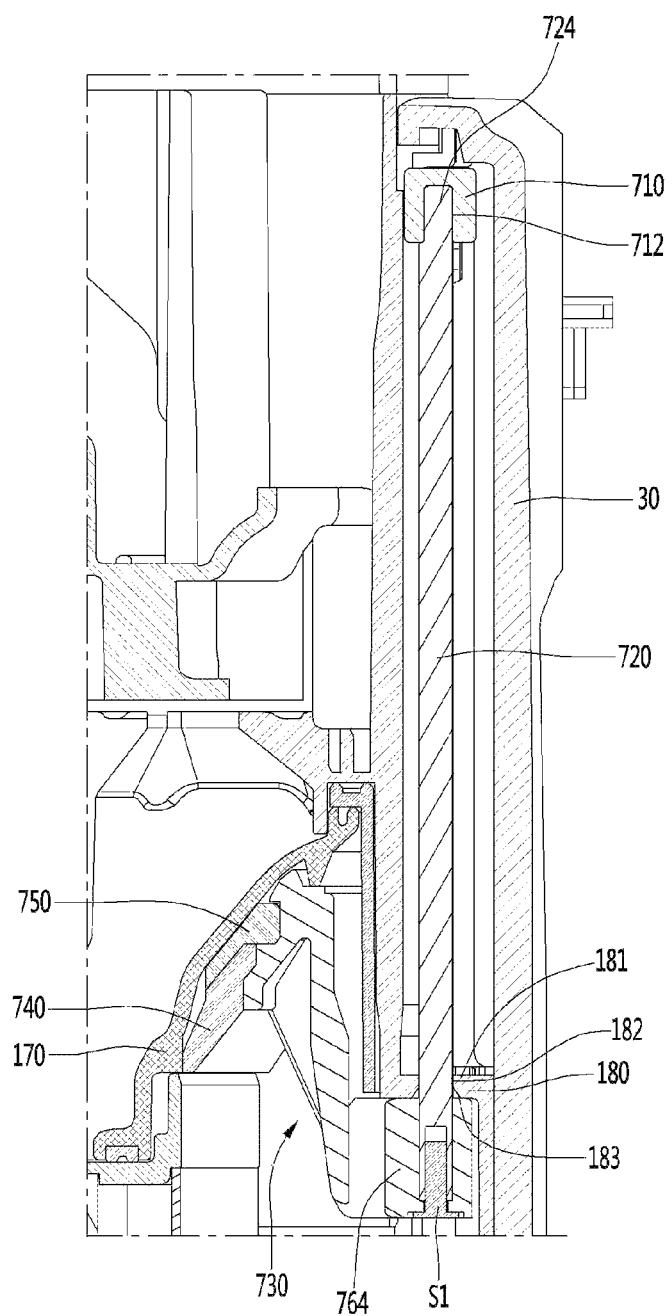
FIG. 21 is a cross-sectional view taken along line E-E of FIG. 1.
Figure 22:
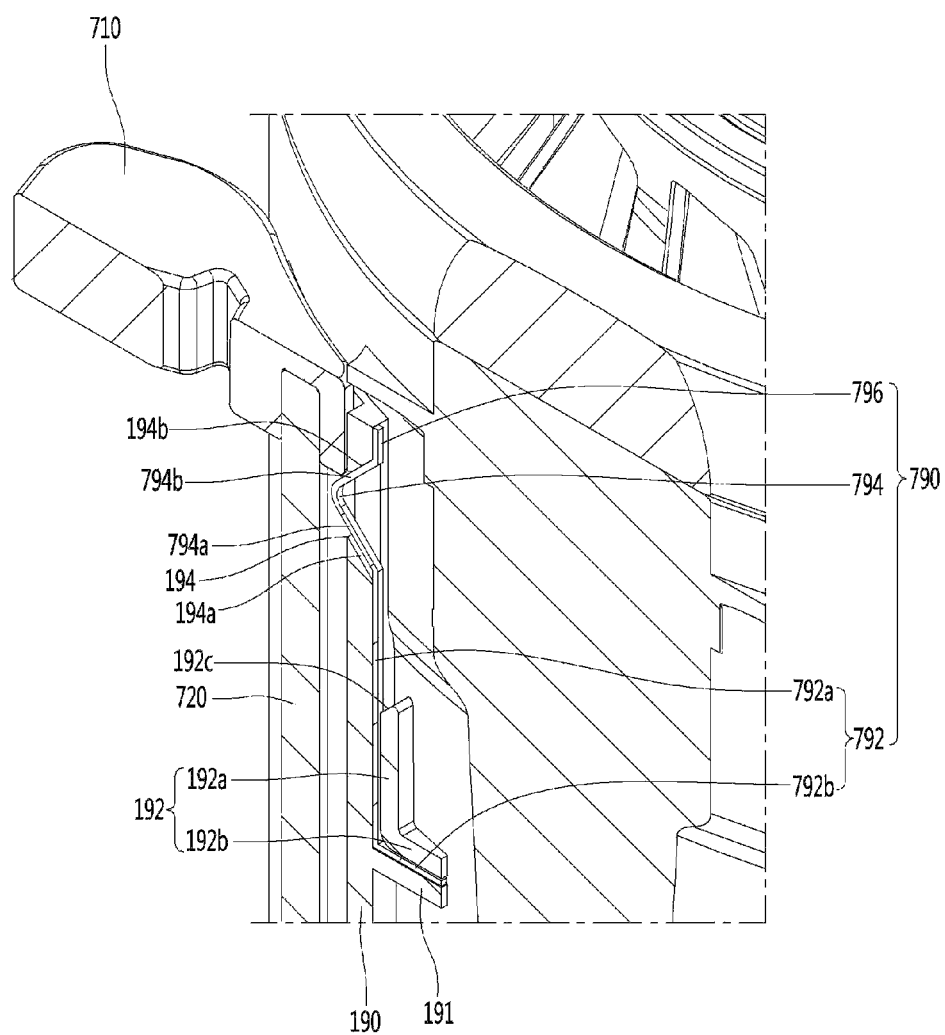
FIG. 22 is a cross-sectional view taken along line F-F of FIG. 1.

FIG. 20 is a cross-sectional view taken along line D-D of FIG. 1, FIG. 21 is a cross-sectional view taken along line E-E of FIG. 1, and FIG. 22 is a cross-sectional view taken along line F-F of FIG. 1.

Referring to FIGS. 1 and 20 to 22, the manipulation part 710 may include a first part 711 which is disposed within the handle part 3 and a second part 713 which extends from the first part 711 in a horizontal direction and is disposed outside the handle part 3.

Since the second part 713 is disposed outside the handle part 3, a user may press an upper surface of the second part 713. In the manipulation part 710, the second part 713 may be referred to as a press part.

Moreover, the manipulation part 710 may be disposed to be higher than the movable part 710. Although not limited, the manipulation part 710 may be disposed close to an upper surface of the handle part 3. Therefore, the user may easily check the manipulation part 710 to press the manipulation part 710.

The first part 711 may include a first side part 711a which faces an outer circumference surface of the second main body 20 and is provided to have substantially the same as curvature as that of the outer circumference surface of the second main body 2.

The second main body 20 may include a guide rib 190 which guides a portion of the first part 711. The guide rib 190 may protrude from the outer circumference surface of the second main body 20 and may extend in a vertical direction.

The guide rib 190 may be rounded in a horizontal direction in order for first part 711 to stably move upward and downward. Therefore, the first part 711 may further include a second side part 711b which is rounded to have substantially the same curvature as that of the guide rib 190.

In the present embodiment, the first side part 711a of the first part 711 may contact the second main body 20, and the second side part 711b of the first part 711 may contact the guide rib 190.

When the manipulation part 710 is lowered in a state where a plurality of points of the first part 711 contact a peripheral structure, a phenomenon where the manipulation part 710 is inclined in a horizontal direction in a lowering process may be prevented, and thus, the manipulation part 710 may be stably lowered (the same as a raising case).

The transfer part 720 may be connected to the first part 711. A fitting groove 712 into which a portion of the transfer part 720 is fitted may be provided in the first part 711.

In order to prevent a relative rotation of each of the transfer part 720 and the manipulation part 710 in a process of manipulating the manipulation part 710, a horizontal cross-sectional surface of a portion 724, into which the fitting groove 712 is inserted, of the transfer part 720 may be provided in a noncircular shape.

Therefore, a cross-sectional surface of the fitting groove 712 may be provided in a non-circular shape. The fitting groove 712 may be formed by upward recessing a lower surface of the first part 711.

The manipulation part 710 may further include a neck part 714 provided between the first part 711 and the second part 713.

The neck part 714 may be provided to have a width which is narrower than a horizontal-direction width of each of the first part 711 and the second part 713. The neck part 714 may be disposed in the slot 310 of the handle part 3.

The handle body 30 may include a guide end part 714 which contacts the neck part 714 in a state where the neck part 714 is disposed in the slot 310.

One side of the neck part 714 may contact the outer circumference surface of the second main body 20, and the other side thereof may contact the guide end part 311. The guide end part 311 may surface-contact the neck part 714.

When the guide end part 311 contacts the neck part 714 of the manipulation part 710 as described above, a phenomenon where the manipulation part 710 is inclined in a left-right direction and rotates in a horizontal direction may be prevented, and thus, the manipulation part 710 may be stably lowered (the same as a raising case).

Since a user should press the second part 713, a horizontal-direction width of the second part 713 may be provided to be greater than that of the first part 711.

Moreover, the second part 713 may be bent to distance from the outer circumference surface of the second main body 20 with respect to the neck part 714, so that a space enabling the second part 713 to be pressed is secured at a boundary portion between the second main body 20 and the handle body 30.

Therefore, the second part 713 may be apart from the outer circumference surface of the second main body 20. That is, the second part 713 may include a side part which is rounded in a direction distancing from the outer circumference surface of the second main body 20.

Since the second part 713 is bent to distance from the outer circumference surface of the second main body 20, the second part 713 may be lowered while covering the slot 310 in a process of lowering the manipulation part 710, thereby minimizing a degree to which an internal structure of the handle part 3 is exposed at the outside through the slot 310.

Referring to FIG. 20, a virtual line A2 which extends in a tangential direction with respect to the outer circumference surface of the second main body 20 and passes through the transfer part 720 may be disposed to pass through the second part 713 or to overlap the second part 713 in a vertical direction.

Moreover, the second part 713 may be bent at the neck part 714 so that the second part 713 of the manipulation part 710 is disposed to the left of the handle part 3 and is disposed close to the handle part 3 in a state where a right hand grips the handle part 3. Accordingly, the user may easily check and manipulate the second part 713 of the manipulation part 710.

An elastic member 790 for elastically supporting the manipulation part 710 may be supported by the guide rib 190 in a state where the compression mechanism 70 is disposed at the standby position.

When the elastic member 790 supports the manipulation part 710, the compression mechanism 70 may be prevented from being undesirably lowered by a weight of the compression mechanism 70.

In detail, the elastic member 790 may include a first elastic body 792, a supporting body 794 which extends in a bent shape from an upper end of the first elastic body 792 and supports a lower portion of the manipulation part 710, and a second elastic body 796 which extends from an upper end of the supporting body 794.

The first elastic body 792 may extend in a vertical direction, and a portion of a lower portion thereof may be bent and may extend in a horizontal direction. That is, the first elastic body 792 may be provided in, for example, an L-shape.

Therefore, the first elastic body 792 may include a vertical extension part 792a and a horizontal extension part 792b.

The vertical extension part 792a may contact the guide rib 190.

The supporting rib 191 may extend from the guide rib 190 in a horizontal direction. Also, the horizontal extension part 792b of the first elastic body 792 may be seated on the supporting rib 191.

A fixing rib 192 for fixing a position of the first elastic body 792 may be provided on the outer circumference surface of the second main body 20. The fixing rib 192 may be provided in, for example, an L-shape.

The fixing rib 192 may include a vertical rib 192a which extends in a vertical direction and a horizontal rib 192b which extends from a lower end of the vertical rib 192a in a horizontal direction.

The vertical extension part 792a may be disposed between the vertical rib 192a and the guide rib 190. Also, the horizontal extension part 792b may be disposed between the supporting rib 191 and the horizontal rib 192b.

In order to limit the vertical movement and horizontal movement of the first elastic body 792, the vertical extension part 792a may contact the vertical rib 192a and the guide rib 190, and the horizontal extension part 793 may contact the supporting rib 191 and the horizontal rib 192b.

A vertical length of the vertical rib 192a may be set to be shorter than that of the vertical extension part 792a so that a portion of the vertical extension part 792a is elastically deformed.

Therefore, the vertical rib 192a may contact only a portion of the vertical extension part 792a, and a portion, which does not contact the vertical extension part 792a, of the vertical rib 192a may be elastically deformed.

In order to prevent the vertical extension part 792a from being damaged by the vertical rib 192a in a process where the vertical rib 192a is elastically deformed, an inclined surface 192c may be provided on an upper surface of the vertical rib 192a.

The inclined surface 192c may be provided to be downward inclined in a direction from an upper end of the vertical rib 192a to the vertical extension part 792a.

The supporting body 794 may include a first inclined part 794a which is upward inclined in a direction closer to the transfer part 720 at an upper end of the vertical extension part 792 and a second inclined part 794b which is upward inclined in a direction distancing from the transfer part 720 at an upper end of the first inclined part 794a.

A slot 194 through which the supporting body 794 passes may be provided in the guide rib 190.

The transfer part 720 may be disposed apart from the guide rib 190 in a horizontal direction, and the supporting body 794 may be disposed between the guide rib 190 and the transfer part 720 to pass through the slot 194. Also, the supporting body 794 may support a lower surface of the first part 711 of the manipulation part 710.

A horizontal-direction length of each of the first inclined part 794*a* and the second inclined part 794*b* may be set to be longer than that of the slot 194 so that the supporting body 794 supports the lower surface of the first part 711 of the manipulation part 710.

A horizontal-direction length of each of the first inclined part 794*a* and the second inclined part 794*b* may be set to be shorter than that of each of the vertical extension part 792*a* and the transfer part 720, so as to prevent the supporting body 794 from contacting the transfer part 720 with supporting the first part 711 of the manipulation part 710.

Therefore, the lower surface of the first part 711 of the manipulation part 710 may substantially contact the second inclined part 794*b*.

The slot 194 may include a first inclined surface 194*a* contacting the first inclined part 794*a* and a second inclined surface 194*b* contacting the second inclined part 794*b*, so as to prevent a phenomenon where the compression mechanism 70 sags downward due to the elastic deformation of the supporting body 794 which is caused by a weight of the compression mechanism 70 in a state where the lower surface of the first part 711 of the manipulation part 710 contacts the second inclined part 794*b*.

The second elastic body 796 may extend vertically from an upper end of the second inclined part 794*b*. The second elastic body 796 may contact the guide rib 190 to prevent the supporting body 794 from being excessively deformed and to maintain an inclined angle of each of the first inclined part 794*a* and the second inclined part 794*b*.

The supporting body 794 in the elastic member 790 may be disposed on a vertical movement path of the manipulation part 710.

Therefore, the elastic member 790 may provide an elastic force to the manipulation part 710 before manipulating the manipulation part 710. Also, the elastic member 790 may not provide an elastic force to the manipulation part 710 after the manipulation part 710 is manipulated to pressurize and deform the elastic member 790.

A force greater than an elastic force of the elastic member 790 may be applied for deforming the elastic member 790 at an initial manipulation stage of the manipulation part 710, and after the elastic member 790 is deformed, the manipulation part 710 may be pressed in a state where the elastic force of the elastic member 790 is not applied to the manipulation part 710, thereby decreasing a force applied to the manipulation part 710.

That is, the elastic member 790 may not continuously provide the elastic force to the manipulation part 710 in a process of lowering the manipulation part 710, and thus, a force for manipulating the manipulation part 710 may be reduced.

As described above, the guide body 180 may be provided outside the first body 10.

The guide body 180 may protrude from the outer circumference surface of the first body 10, and an upper sidewall 181 of the guide body 180 may overlap the transfer part 720 in a vertical direction.

Therefore, the transfer part 720 may pass through the upper sidewall 181 of the guide body 180. The upper sidewall 181 of the guide body 180 may be substantially a horizontal surface, and an opening 182 through which the transfer part 720 passes may pass through the upper sidewall 181 in a vertical direction.

That is, the transfer part 720 may pass through the opening 182 in a vertical direction and may move in a vertical direction even in a state where the transfer part 720 passes through the opening 182.

According to the present embodiment, the transfer part 720 may pass through the opening 182, and moreover, a size of the opening 182 for providing a path through which the transfer part 720 moves may be minimized, thereby preventing the internal air and dust of the first body 10 from being leaked to the outside through the opening 182.

At least a portion of the opening 182 may be provided to have a diameter which increases in a direction closer to a lower portion thereof, so that the transfer part 720 moves smoothly in a vertical direction in a state where the transfer part 720 passes through the upper sidewall 181 of the guide body 180. That is, the opening 182 may include a lower inclined surface 183. A minimum diameter of the opening 182 may be substantially the same as an outer diameter of the transfer part 720.

Therefore, the transfer part 720 may contact a portion of a perimeter surface of the opening 182 and may not contact the other portion with being disposed in the opening 182.

A contact area between the transfer part 720 and the perimeter surface of the opening 182 may be reduced, and thus, a frictional force between the perimeter surface of the opening 182 and the transfer part 720 may decrease, whereby the transfer part 720 may smoothly move upward and downward.

The coupling part 764, coupled to the transfer part 720, of the frame 760 may be disposed vertically under the opening 182. That is, the transfer part 720 passing through the opening 182 may be coupled to the coupling part 764.

A diameter of the coupling part 764 may be set to be greater than that of the opening 182.

Moreover, the coupling part 764 may contact a lower surface of the upper sidewall 181 at the standby position. Accordingly, the coupling part 764 may cover the opening 182 at the standby position.

Therefore, in a state where the movable part 730 is disposed at the standby position, the internal air and dust of the first body 10 may be effectively prevented from being leaked through the opening 182.

In the present embodiment, when the user manipulates the manipulation part 710 in one direction, the compression mechanism 70 may be lowered, and in a state where the compression mechanism 70 moves up to a lowering position, the user may raise the manipulation part 710 in the other direction to return the manipulation part 710 to the standby position.

In the present embodiment, the cleaner 1 may not include a return means for returning the compression mechanism 70 from the lowering position to the standby position.

The return means may prevent the compression mechanism 70 from being lowered by a weight thereof when the compression mechanism 70 is disposed at the standby position.

However, in the present embodiment, although the return means is not provided, the compression mechanism 70 may not be lowered by a weight thereof at the standby position.

This is because three portions of the compression mechanism 70 are supported at the standby position of the compression mechanism 70.

First, the first part 711 of the manipulation part 710 may be supported by the elastic member 780, and thus, lowering of the manipulation part 710 may be limited by a weight of the compression mechanism 70. As described above, the elastic member 780 may not provide the elastic force to the manipulation part 710 in a period, other than an initial period, of a lowering period of the manipulation part 710.

Second, lowering of the compression mechanism 70 caused by a weight thereof may be limited by a frictional force between the transfer part 720 and the perimeter surface of the opening 182. That is, since the transfer part 729 contacts the perimeter surface of the opening 182, the frictional force between the transfer part 720 and the perimeter surface of the opening 182 may act as a supporting force of the compression mechanism 70.

Third, lowering of the compression mechanism 70 caused by a weight thereof may be limited by a contact frictional force between the contact surface 175 of the air guide 170 and the cleaning surface 741 of the cleaning part 740.

Due to three structures according to the present embodiment, a return means for returning the compression mechanism 70 is not needed, and thus, a structure where the return means is formed and disposed may be omitted, thereby simplifying a structure.

Moreover, the return means may not smoothly operate due to dust penetrating into the return means, thereby preventing a phenomenon where the compression mechanism 70 does not smoothly move.

Figure 23:
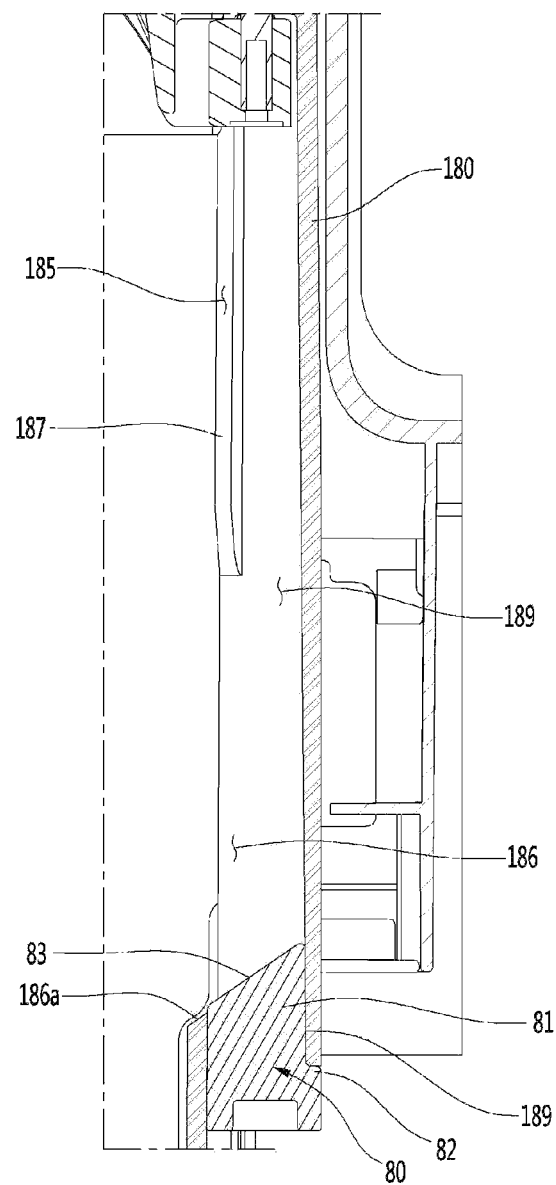
FIG. 23 is a cross-sectional view taken along line G-G of FIG. 3.
Figure 24:
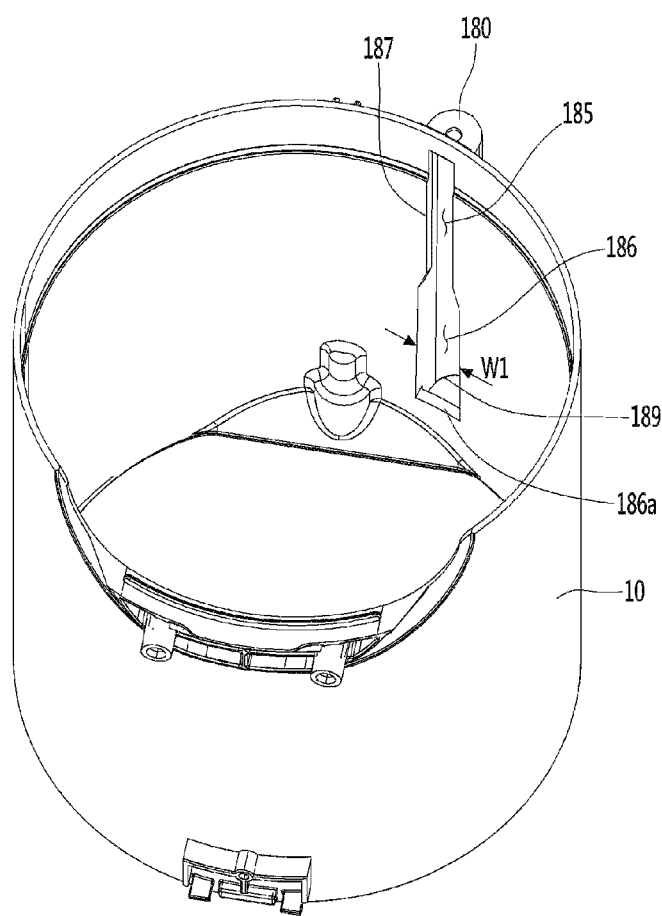
FIG. 24 is a perspective view illustrating an internal structure of a first body according to an embodiment.
Figure 25:
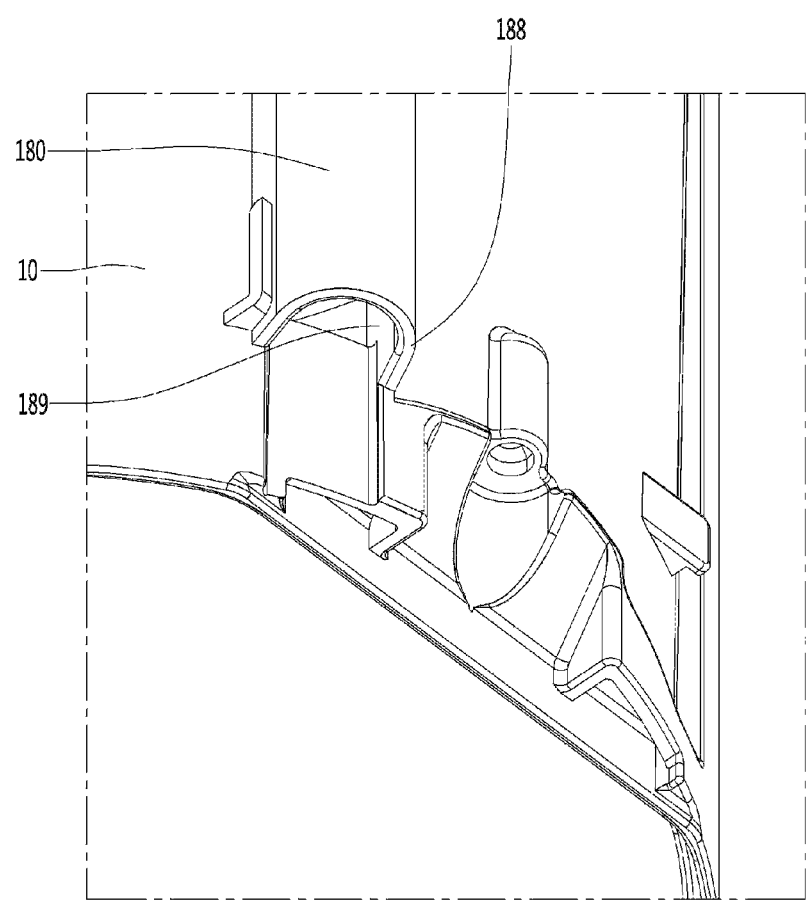
FIG. 25 is a perspective view illustrating a guide body of a first body according to an embodiment.

FIG. 23 is a cross-sectional view taken along line G-G of FIG. 3, FIG. 24 is a perspective view illustrating an internal structure of a first body according to an embodiment, and FIG. 25 is a perspective view illustrating a guide body of a first body according to an embodiment.

Referring to FIGS. 23 to 25, the guide body 180 may have a structure which is formed by outward recessing a portion of the first body 10, and the guide body 180 may provide a movement space 188 for movement of the transfer part 720 and the coupling part 764.

The guide body 180 may be rounded to be convex outward from the first body 10. That is, a horizontal cross-sectional surface of the guide body 180 may be provided in an approximately semicircular shape.

The movement space 188 may communicate with an internal space of the first body 10. The internal space of the first body 10 may communicate with the movement space 188 of the guide rib 180 through a communication hole.

The communication hole may include an upper hole 185 and a lower hole 186 which extends downward from the upper hole 185 and has a width greater than that of the upper hole 185.

The reason that a width of the lower hole 186 is set to be greater than that of the upper hole 185 is for enabling the coupling part 764 of the movable part 730 to be easily inserted into the movement space 188 through the lower hole 186. Accordingly, the assemblability of the movable part 730 may be enhanced.

For example, a width W1 of the lower hole 186 may be set to be greater than a diameter of the coupling part 764.

Moreover, an outer circumference surface of the coupling part 764 may be apart from an inner circumference surface of the guide body 180 in a state where the coupling part 764 passes through the lower hole 186. This is for preventing friction between the coupling part 764 and the inner circumference surface of the guide body 180 in a process of lowering and raising the compression mechanism 70.

The first body 10 may include a pair of ribs 187 which are apart from each other in a horizontal direction. The pair of ribs 187 may substantially define the upper hole 185. That is, the upper hole 185 may be disposed between the pair of ribs 187.

The pair of ribs 187 may be provided at a portion, corresponding to an upper space, of a movement space of the first body 10 so as to decrease a width of the upper hole 185.

An interval (i.e., a width of the upper hole 185) between the pair of ribs 187 may be set to be less than a diameter of the coupling part 764 and greater than a horizontal-direction width of the extension part 763 of the frame 760.

Therefore, when cyclone flow is rotated in an upper portion of the first body 10, the amount of dust penetrating into the movement space 188 may be minimized.

A lower sidewall 188 of the guide body 180 may be disposed at a height from a lower end of the first body 10, and a lower opening 189 may be provided in the lower sidewall 188.

In an assembly process, the lower opening 189 may provide a path through which an instrument for fastening the coupling part 764 to the transfer part 720 moves in a state where the movable part 730 is disposed in the first body 710 and the coupling part 764 is disposed in the guide body 180.

Therefore, a sealing member 80 may be coupled to the lower opening 189, for preventing the leakage of air after assembly is completed. For example, the sealing member 80 may include an inserting part 81 inserted into a space of the guide body 180 through the opening 189.

Moreover, the sealing member 80 may further include a stopper 82 having a horizontal cross-sectional area which is greater than that of the inserting part 81, for limiting an insertion depth of the inserting part 81.

The sealing member 81 may be formed of, for example, a rubber material, and thus, even without a separate coupling means, the inserting part 81 may be inserted into the guide body 180, whereby the sealing member 80 may be coupled to the guide body 180.

An upper surface of the sealing member 80 may be downward inclined in a direction closer to a center of the first body 10. That is, the sealing member 80 may include an inclined surface 83.

A lowest point of the inclined surface 83 may be disposed adjacent to the lower hole 186 and may be disposed to be higher than a lowest point 186*a* of the lower hole 186.

The movement space 188 of the guide body 180 may communicate with an internal space of the first body 10, and thus, in a cleaning process using the cleaner 1, the internal dust of the first body 10 may move to the movement space 188.

The dust which has moved to the movement space 188 may be dropped to an upper surface of the sealing member 80. In this case, the upper surface of the sealing member 80 may be the inclined surface 83, and thus, dust dropped to the inclined surface 83 of the sealing member 80 may smoothly penetrate into the first body 10.

For example, even when dust is collected on the inclined surface of the sealing member 80, the coupling part 764 may downward pressurize the dust disposed on the inclined surface 83 in an operating process of the compression mechanism 70, and thus, the dust on the inclined surface 83 may flow into the first body 10 along the inclined surface 83.

Figure 26:
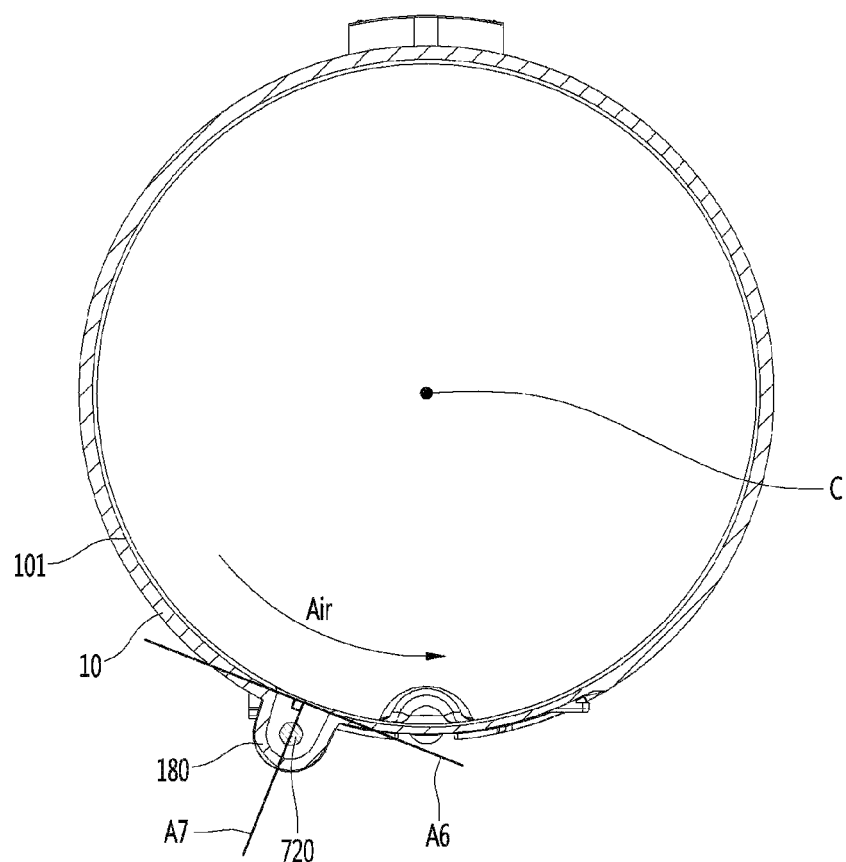
FIG. 26 is a cross-sectional view taken along line H-H of FIG. 3.
Figure 27:
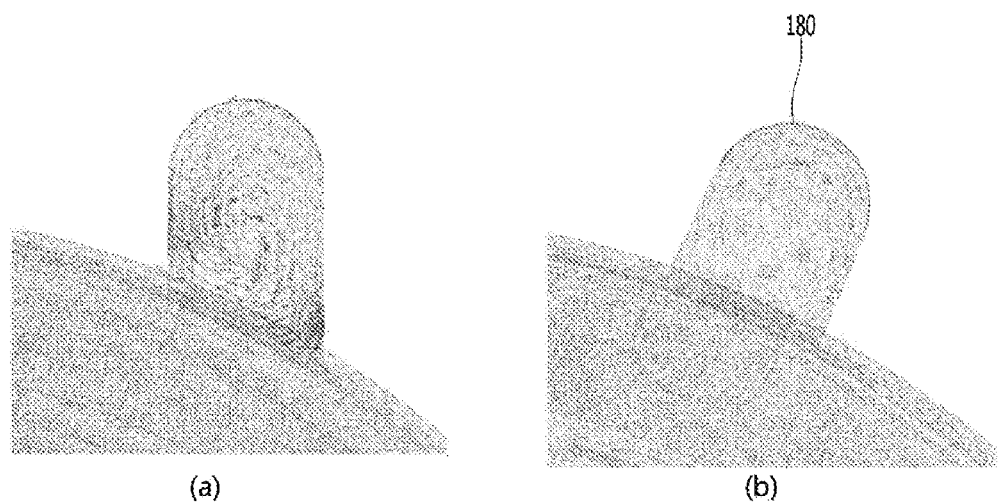
FIG. 27 is a diagram illustrating air flow in a guide body when a guide body extends in an inclined direction in a normal-line direction and when a guide body extends in the normal-line direction with respect to a tangential line of the air flow.
Figure 28:
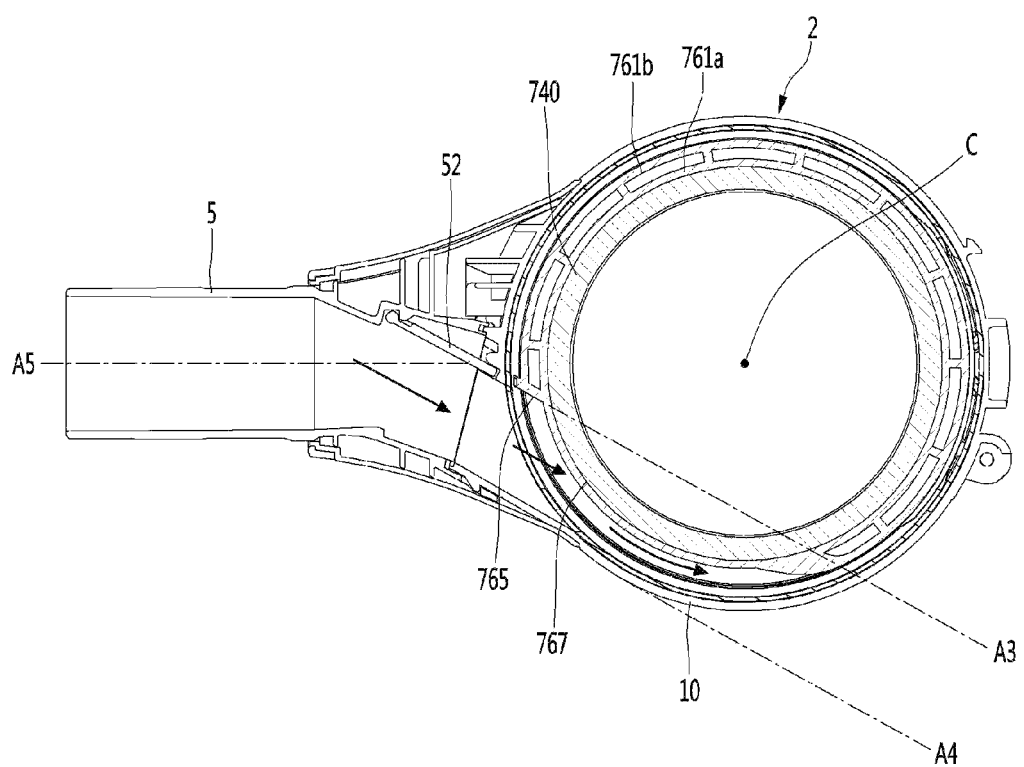
FIG. 28 is a cross-sectional view taken along line I-I of FIG. 3.

FIG. 26 is a cross-sectional view taken along line H-H of FIG. 3, and FIG. 27 is a diagram illustrating air flow in a guide body when a guide body extends in an inclined direction in a normal-line direction and when a guide body extends in the normal-line direction with respect to a tangential line of the air flow. FIG. 28 is a cross-sectional view taken along line I-I of FIG. 3.

First, referring to FIGS. 26 and 27, the guide body 180 may protrude outward from the first body 10 in a radius direction thereof.

For example, the guide body 180 may protrude in a direction toward a normal line A7 with respect to a tangential line A6 of flow of air flowing along the inner circumference surface 101 of the first body 10 or a tangential line of the first body 10.

When the guide body 180 protrudes in a direction toward the normal line A7, the amount of air flowing into the guide body 180 may be reduced, and moreover, an eddy current in the guide body 180 may be minimized, whereby the air flowing into the guide body 180 may be easily discharged from the guide body 180.

Referring to FIG. 27(a), when the guide body is inclined with respect to the normal line A7, the amount of air flowing into the guide body may increase, and moreover, an eddy current may be formed in the guide body, whereby the air flowing into the guide body may not be discharged from the guide body.

Air and dust may simultaneously flow into the guide body, and thus, the dust may be in the guide body in a stagnant state, and thus, the transfer part 720 may not smoothly move in a vertical direction in the guide body.

On the other hand, referring to FIG. 27(b), when the guide body 180 protrudes in a direction toward the normal line A7, the amount of air flowing into the guide body 180 may decrease, and moreover, an eddy current may be reduced in the guide body 180, whereby dust and the air flowing into the guide body may be smoothly discharged from the guide body 180. Accordingly, the transfer part 720 may smoothly and vertically move in the guide body 180.

Referring to FIGS. 4, 26, and 28, a lengthwise-direction axis A5 of the suction part 5 may not extend to the main body 2 in a tangential direction with the suction part 5 being coupled to the main body 2.

In order for cyclone flow to be generated in the main body 2, the air may flow into the first body 10 in the tangential direction and may move along the inner circumference surface of the first body 10.

Therefore, the suction part 5 may include an inflow guide 52 for guiding air, flowing in the suction part 5, to flow into the first body 10 in the tangential direction.

Therefore, a direction of air flowing along the suction part 5 may be changed by the inflow guide 52, and the air may flow into the first body 10.

In the present embodiment, in a state where the compression mechanism 70 moves to the standby position, at least a portion of the movable part 730 may be disposed to face the suction part 5. That is, with respect to a floor of the main body 2, at least a portion of the movable part 730 may be disposed at the same height as the suction part 5.

The movable part 730 may be disposed at a position which does not face the suction part 5, but in this case, there may be a problem where a height of the main body 2 increases.

The filter part 130 may be cleaned by the movable part 730 in a state where the movable part 730 is disposed in a space between the outer circumference surface of the filter part 130 and the inner circumference surface 101 of the first body 10 in a cleaning process.

Therefore, the outer circumference surface of the movable part 730 may be disposed adjacent to the inner circumference surface 101 of the first body 10.

When the movable part 730 is disposed on a path from the suction part 5 to the first body 10, the movable part 730 may act as a flow resistor, and due to this, flow performance may decrease.

Therefore, in the present embodiment, in order to minimize a degree to which the movable part 730 acts as a flow resistor of air flowing into the first body 10, the recessed portion 767 for increasing a space between the inner circumference surface 101 of the first body 10 and the outer circumference surface of the movable part 730 may be provided in the movable part 730 as described above.

In detail, the recessed portion 767 may be disposed at a portion disposed between a first extension line A3 of the inflow guide 52 and a second extension line A4 which extends in a tangential direction of the first body 10 in parallel with the first extension line A3, in the movable part 730. In this case, the first extension line A3 may be disposed between the second extension line A4 and a center of the first body 10.

Therefore, a space between the outer circumference surface of the movable part 730 and the inner circumference surface 101 of the first body 10 may increase by a recessed depth of the recessed portion 767. Accordingly, air flowing into the first body 10 through the suction part 5 may be prevented from directly colliding with the movable part 730.

In order for the frame guide 765 to continuously guide air flowing along the inflow guide 52, the frame guide 765 may be disposed on the first extension line A3, or an extension direction of the frame guide 765 may be parallel to the first extension line A3.

Since the movable part 730 should be disposed in a space between the filter part 130 and the inner circumference surface 101 of the first body 10, movement of the movable part 730 should be performed without an increase in a size of the first body 10.

Therefore, in the present embodiment, the movable part 730 may be disposed inward in a radius direction of the inner circumference surface 101 which is a surface enabling cyclone flow to be generated in the first body 10, and the transfer part 720 may be disposed outward in the radius direction of the inner circumference surface 101 which is a surface enabling cyclone flow to be formed in the first body 10. Also, the transfer part 720 may be connected to the movable part 730 by the extension part 763 and the coupling part 764 of the frame 760.

That is, the transfer part 720 may be disposed outward in a radius direction of an inner circumference surface where cyclone flow is generated in the first cyclone part 110 and may be disposed outward in a radius direction of an inner circumference surface of the dust container 112.

Therefore, interference between the transfer part 720 and an internal structure of the first body 10 may be prevented in a process of transferring, by transfer part 720, the manipulation force of the manipulation part 710 to the movable part 730.

Figure 29:
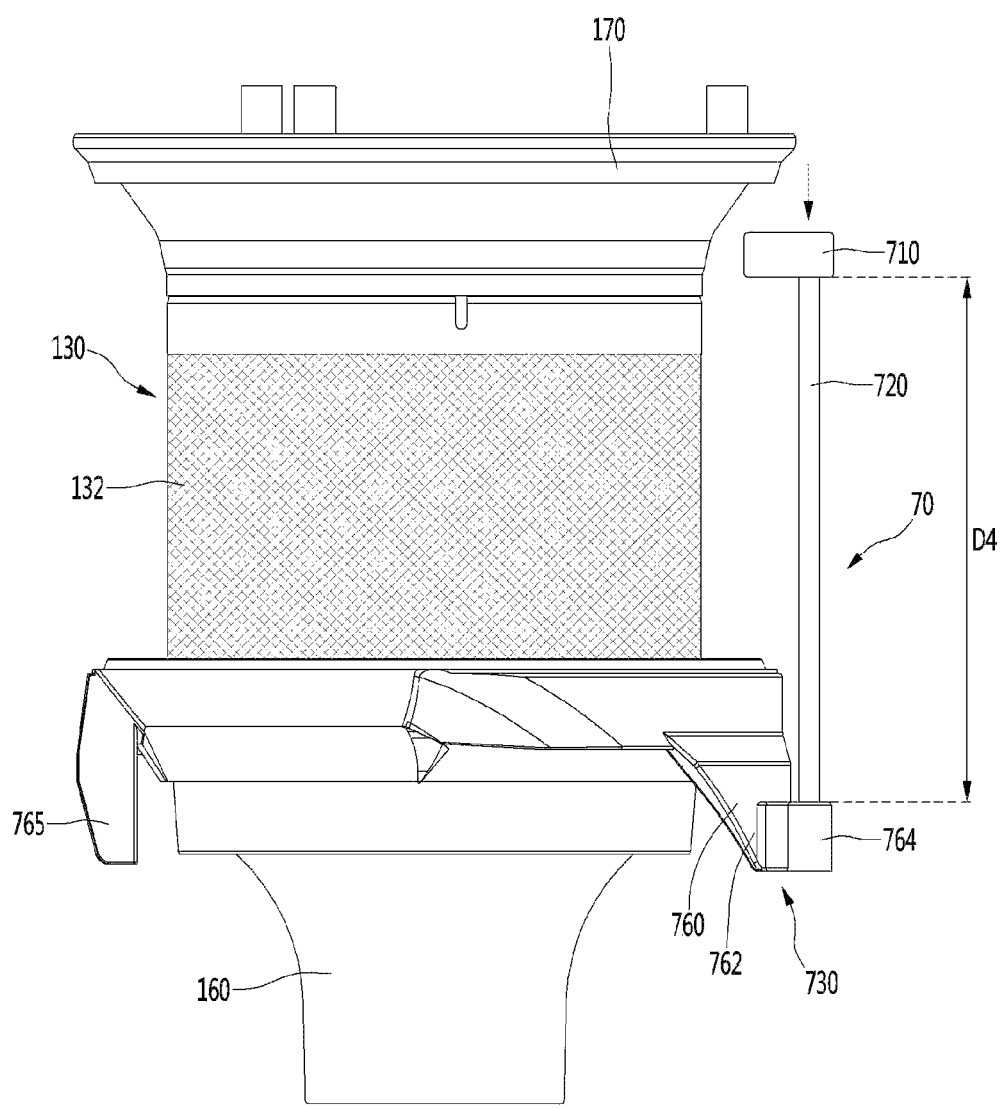
FIG. 29 is a diagram illustrating a position of each of a compression mechanism and a filter part in a state where the compression mechanism according to an embodiment is lowered.
Figure 30:
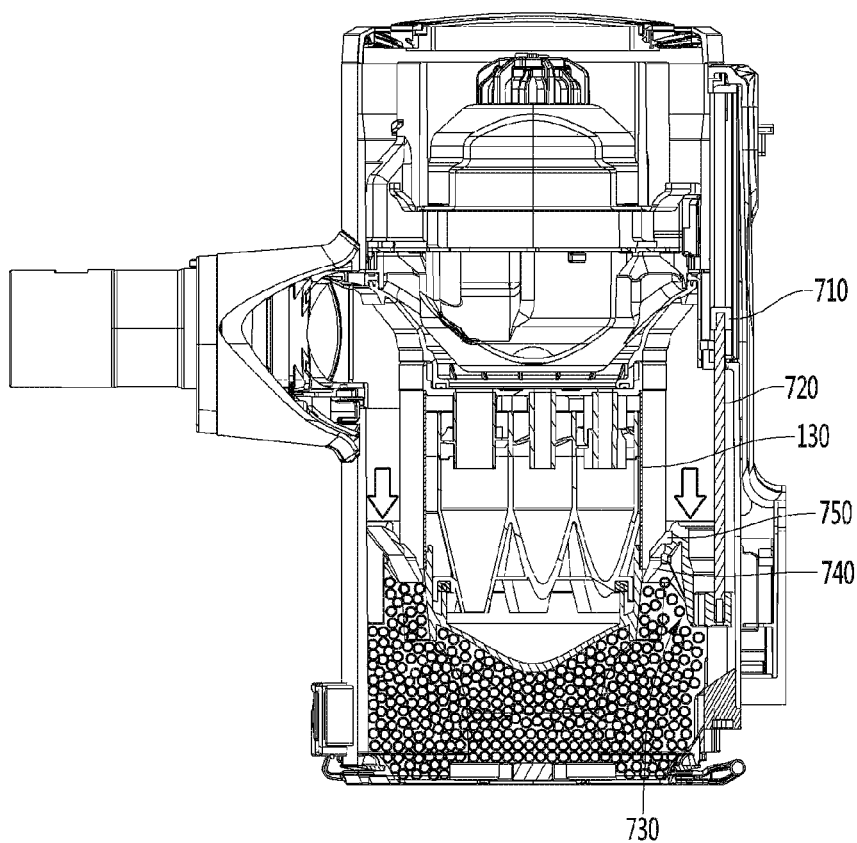
FIG. 30 is a diagram illustrating a state where a compression mechanism according to an embodiment is lowered and compresses dust in a dust container.

FIG. 29 is a diagram illustrating positions of a compression mechanism and a filter part in a state where the compression mechanism according to an embodiment is lowered, and FIG. 30 is a diagram illustrating a state where a compression mechanism according to an embodiment is lowered and compresses dust in a dust container.

Referring to FIGS. 4, 5, 29, and 30, in a state where the compression mechanism 70 moves to the standby position, the user may perform cleaning by using the cleaner 1.

Based on an operation of the suction motor 220, air and dust suctioned through the suction part 5 may be separated from each other while flowing along the inner circumference surface of the first cyclone part 112.

Dust separated from air may flow downward and may be stored in the first dust storage part 121. Air separated from dust may pass through the filter part 130, and then, may flow to the second cyclone part 140.

Dust separated from air in the second cyclone part 140 may be discharged from the second cyclone part 140, may flow downward, and may be stored in the second dust storage part 122. On the other hand, air separated from dust in the second cyclone part 140 may be discharged from the second cyclone part 140 through the discharge guide 150. Air discharged from the second cyclone part 140 may be raised by the air guide 170, and then, may pass through the suction motor 220 and may be discharged to the outside of the main body 2.

After ending of the cleaning, the user may pressurize the manipulation part 710. Therefore, the manipulation force of the manipulation part 710 may be transferred to the movable part 730 through the transfer part 720. Accordingly, the movable part 730 may be lowered by a lowering force of the manipulation part 710.

The movable part 730 may perform three functions in a process of lowering the movable part 730.

First, the movable part 730 may perform a cleaning function of the filter part 130.

The cleaning surface 741 of the cleaning part 740 may contact the filter part 130 in a process of lowering the movable part 730, and the movable part 730 may be continuously lowered in a state where the cleaning surface 741 contacts the filter part 130, whereby the filter part 130 may be cleaned by the cleaning surface 741.

Second, in a state where the body cover 114 closes a lower portion of the first body 10, the movable part 730 may compress dust in the first dust storage part 120 in a process of lowering the movable part 730.

Third, in a state where the body cover 114 opens the lower portion of the first body 10, the movable part 730 may discharge the dust, stored in the first dust storage part 120, to the outside of the first body 10 in a process of lowering the movable part 730.

Particularly, dust disposed between the filter part 130 and the inner circumference surface 101 of the first body 10 may be downward pushed by the movable part 730 and may be effectively discharged from the first body 10.

In this case, the user may lower the compression mechanism 70 a plurality of times to compress dust in a state where the body cover 114 is closed, and then, in a state where the body cover 114 is opened, the user may lower the compression mechanism 70 to allow dust to be discharged from the first body 10.

The movable part 730 may be lowered while cleaning the filter part 130, and when the movable part 730 contacts the dust stored in the first dust storage part 120 in a process of lowering the movable part 730, the movable part 730 may compress the first dust storage part 120.

As described above, in a process of lowering the movable part 730, one or more of the frame guides 765 and the pressurization rib 762 may compress the dust in the first dust storage part 120, and based on additional lowering of the movable part 730, the other portion of the movable part 730 may compress dust.

As in FIG. 29, the coupling part 764 may be substantially disposed at a lowermost portion of the frame 760. That is, since the coupling part 764 is disposed at a lower portion in the movable part 730, a distance D4 between the coupling part 764 and the manipulation part 710 may increase.

Moreover, the manipulation part 710 may be disposed close to an upper surface of the handle part 3, and thus, the distance D4 between the coupling part 764 and the manipulation part 710 may increase.

The distance D4 between the coupling part 764 and the manipulation part 710 may determine a stroke for the vertical movement of the compression mechanism 70, and when the distance D4 between the coupling part 764 and the manipulation part 710 increases, a vertical movement stroke of the compression mechanism 70 may increase.

When the vertical movement stroke of the compression mechanism 70 increases, compression performance for the dust stored in the first dust storage part 112 may be enhanced.

Figure 31:
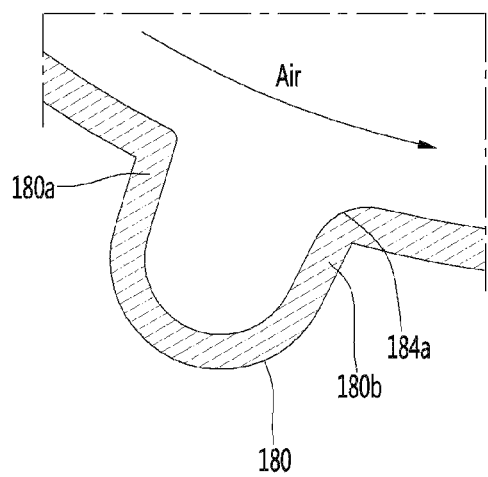
FIG. 31 is a diagram illustrating a guide body according to another embodiment.

FIG. 31 is a diagram illustrating a guide body according to another embodiment.

In FIG. 31, the other parts may be the same as a preceding embodiment, and there may be a difference in shape of a main body in a portion where a guide body is provided. Hereinafter, therefore, only a feature part according to the present embodiment will be described.

Referring to FIG. 31, the guide body 180 may include a first part 180a and a second part 180b disposed behind the first part 180a, with respect to an air flow direction.

In order for air and dust flowing into the guide body 180 to be easily discharged from the guide body 180, a round part 184a may be provided at a boundary portion between the second part 180b of the guide body 180 and the first body 10.

Therefore, air in the guide body 180 may be smoothly discharged from the guide body 180 along the round part 184a.

Figure 32:
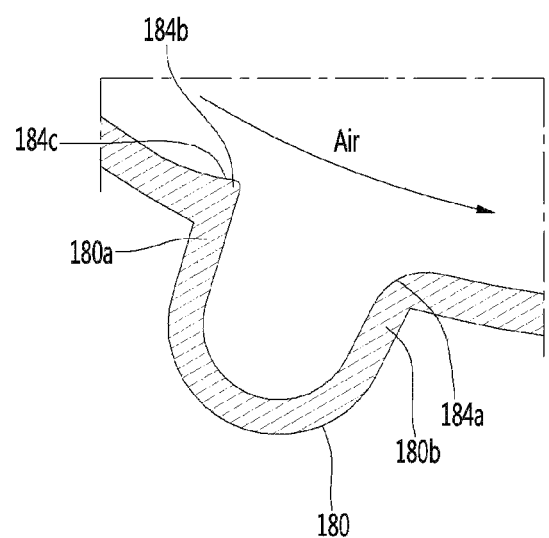
FIG. 32 is a diagram illustrating a guide body and an inner wall of a dust container according to another embodiment.

FIG. 32 is a diagram illustrating a guide body and an inner wall of a dust container according to another embodiment.

Referring to FIG. 32, in the present embodiment, a round part 184a may be provided at a boundary portion between the second part 180b of the guide body 180 and the first body 10.

Moreover, a protrusion part 184b for limiting flow of air to the guide body 180 may be provided on the first part 180a in the first body 10.

The protrusion part 184b may protrude a direction from the inner circumference surface of the first body 10 to a center of the first body 10. The protrusion part 184b may include a rounded surface 184c. The rounded surface 184c may be rounded toward the center of the first body 180 as air distances from an initial contact portion.

Therefore, air in the first body 10 may be limited in flowing into the guide body 180 in a process where the air flows along the rounded surface 184c.

What is claimed is:

1. A cleaner comprising:
   a suction part;
   a body including a cyclone part configured to separate dust from air suctioned through the suction part, a dust container configured to store the dust separated by the cyclone part, and a body cover configured to open or close a lower portion of the body;
   a filter part disposed in the body and configured to filter dust from air that passes through the filter part;
   a movable part configured to move along a space between an outer portion of the filter part and an inner circumference surface of the body; and
   a manipulation part disposed outside the main body and connected to the movable part by a transfer part passing through the body and including a portion disposed radially outside of an inner circumference surface of the body where cyclone flow is generated by the cyclone part, wherein a guide body protrudes outward from the body in a horizontal direction and defines a movement space in communication with an internal space of the body through a communication hole, wherein the transfer part is configured to move in the movement space of the guide body, wherein the movable part comprises:
- a frame; and
- a connection part disposed in the movement space and configured to extend radially outward from the frame and pass through the communication hole, wherein the transfer part is connected to the connection part and is configured to pass through an opening defined in an upper sidewall of the guide body, and wherein the transfer part is disposed at a lateral side of the cyclone part and overlaps the cyclone part in the horizontal direction.

2. The cleaner of claim 1, wherein the transfer part is disposed outside of an inner circumference surface of the dust container in the horizontal direction.

3. The cleaner of claim 1, wherein the body is cylindrical in shape.

4. The cleaner of claim 3, wherein the guide body extends in a direction perpendicular to the body.

5. The cleaner of claim 4, wherein the guide body comprises a first part and a second part disposed downstream of the first part with respect to air flow through the body, and
wherein a round part is disposed at a boundary portion between the second part and the body.

6. The cleaner of claim 5, wherein a protrusion part protruding toward a center of the body is disposed adjacent the first part in the guide body.

7. The cleaner of claim 3, wherein the frame has a ring shape.

8. The cleaner of claim 7, wherein the connection part comprises:
- an extension part extending from the frame; and
- a coupling part having a diameter which is greater than a width of the extension part in a horizontal direction, and wherein the transfer part is coupled to the coupling part.

9. The cleaner of claim 8, wherein a line extending from the extension part passes through a center of the frame.

10. The cleaner of claim 8, wherein the communication hole comprises:
- a lower hole having a width that is greater than a diameter of the coupling part; and
- an upper hole extending to an upper portion of the lower hole and having a width that is less than a width of the lower hole.

11. The cleaner of claim 10, wherein the width of the upper hole is greater than the width of the extension part in the horizontal direction and less than the diameter of the coupling part.

12. The cleaner of claim 10, wherein the body comprises a pair of ribs disposed apart from each other in the horizontal direction, and configured to form the upper hole.

13. The cleaner of claim 7, wherein the frame comprises a pressurization rib extending downward from an outer lower end of the frame, and
wherein the connection part extends outward in a radial direction with respect to a lower portion of the pressurization rib.

14. The cleaner of claim 13, wherein the frame further comprises one or more auxiliary ribs protruding in a radially inward direction from an inner circumference surface of the pressurization rib.

15. The cleaner of claim 14, wherein the one or more auxiliary ribs comprises an inclined surface inclined downwardly from a radially outer portion of the one or more auxiliary ribs.

16. The cleaner of claim 13, wherein the suction part comprises an inflow guide configured to guide flow of air so that cyclone flow is generated in the cyclone part, and
wherein the frame comprises a frame guide extending in parallel with the inflow guide and configured to guide air flowing along the inflow guide.

17. The cleaner of claim 16, wherein the frame guide protrudes downwardly from the frame.

18. The cleaner of claim 16, wherein the frame guide is disposed at a position opposite to the pressurization rib with respect to a center of the frame.

19. The cleaner of claim 3, wherein a lower sidewall of the guide body is disposed higher than the body cover and comprises a lower opening covered by a sealing member.

20. The cleaner of claim 19, wherein a portion of the sealing member is inserted into the guide body through the lower opening, and
wherein an upper surface of the sealing member is inclined downwardly in a direction closer to a center of the body.

21. The cleaner of claim 1, further comprising a supporting part configured to support a lower portion of the filter part,
wherein the movable part further comprises a cleaning part configured to clean the filter part as the cleaning part is moved relative to the filter part,
wherein an upper end of the supporting part is equal to or less than a diameter of the filter part, and
wherein an outer circumference surface of the supporting part tapers from a larger diameter at an upper portion thereof to a smaller diameter at a lower portion thereof.

* * * * *